(12) United States Patent
Ringold et al.

(10) Patent No.: US 9,611,590 B2
(45) Date of Patent: Apr. 4, 2017

(54) CREPING ADHESIVES AND METHODS FOR MAKING AND USING SAME

(71) Applicant: Georgia-Pacific Chemicals LLC, Atlanta, GA (US)

(72) Inventors: Clay E. Ringold, Decatur, GA (US); David F. Townsend, Grayson, GA (US); Cornel Hagiopol, Lilburn, GA (US); Karla D. Favors, Atlanta, GA (US); Thomas L. Wright, Oxford, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 235 days.

(21) Appl. No.: 14/535,320

(22) Filed: Nov. 7, 2014

(65) Prior Publication Data

US 2015/0122433 A1 May 7, 2015

Related U.S. Application Data

(60) Provisional application No. 61/901,094, filed on Nov. 7, 2013.

(51) Int. Cl.

| D21H 21/14 | (2006.01) |
|---|---|
| D21H 17/00 | (2006.01) |
| C09J 177/06 | (2006.01) |
| C08G 73/02 | (2006.01) |
| C09J 179/02 | (2006.01) |

(52) U.S. Cl.
CPC ....... *D21H 21/146* (2013.01); *C08G 73/0286* (2013.01); *C09J 179/02* (2013.01); *D21H 17/72* (2013.01)

(58) Field of Classification Search
USPC .................................. 162/111, 184
See application file for complete search history.

(56) References Cited

U.S. PATENT DOCUMENTS

| 3,640,841 A | 2/1972 | Winslow et al. |
|---|---|---|
| 3,879,257 A | 4/1975 | Gentile et al. |
| 3,926,716 A | 12/1975 | Bates |
| 4,063,995 A | 12/1977 | Grossman |
| 4,300,981 A | 11/1981 | Carstens |
| 4,304,625 A | 12/1981 | Grube et al. |
| 4,440,898 A | 4/1984 | Pomplun et al. |
| 4,501,640 A | 2/1985 | Soerens |
| 4,528,316 A | 7/1985 | Soerens |
| 4,684,439 A | 8/1987 | Soerens |
| 4,788,243 A | 11/1988 | Soerens |
| 4,883,564 A | 11/1989 | Chen et al. |
| 4,886,579 A | 12/1989 | Clark et al. |
| 4,994,146 A | 2/1991 | Soerens |
| 5,025,046 A | 6/1991 | Soerens |
| 5,179,150 A | 1/1993 | Furman, Jr. et al. |
| 5,187,219 A | 2/1993 | Furman, Jr. |
| 5,234,547 A | 8/1993 | Knight et al. |
| 5,246,544 A | 9/1993 | Hollenberg et al. |
| 5,326,434 A | 7/1994 | Carevic et al. |
| 5,370,773 A | 12/1994 | Luu et al. |
| 5,374,334 A | 12/1994 | Sommese et al. |
| 5,382,323 A | 1/1995 | Furman, Jr. et al. |
| 5,437,766 A | 8/1995 | Van Phan et al. |
| 5,468,796 A | 11/1995 | Chen et al. |
| 5,487,813 A | 1/1996 | Vinson et al. |
| 5,490,903 A | 2/1996 | Chen et al. |
| 5,633,309 A | 5/1997 | Warchol et al. |
| 5,660,687 A | 8/1997 | Allen et al. |
| 5,833,806 A | 11/1998 | Allen et al. |
| 5,846,380 A | 12/1998 | Van Phan et al. |
| 5,902,862 A | 5/1999 | Allen |
| 5,942,085 A | 8/1999 | Neal et al. |
| 5,944,954 A | 8/1999 | Vinson et al. |
| 6,222,006 B1 * | 4/2001 | Kokko ............... C08G 73/0286 162/157.6 |
| 6,277,242 B1 * | 8/2001 | Archer ................... C09J 179/02 162/111 |
| 8,246,781 B2 * | 8/2012 | Ringold .................... B31F 1/14 162/111 |
| 2004/0177940 A1 * | 9/2004 | Archer .................... D21F 11/14 162/199 |
| 2007/0151684 A1 * | 7/2007 | Grigoriev .......... C08G 73/0286 162/111 |
| 2009/0133846 A1 * | 5/2009 | Grigoriev ............... C08L 79/02 162/112 |

\* cited by examiner

*Primary Examiner* — Dennis Cordray
(74) *Attorney, Agent, or Firm* — Ram W. Sabnis

(57) ABSTRACT

Creping adhesives and methods for making and using same are provided. The creping adhesive can include a first thermosetting polyamidoamine-epihalohydrin resin that includes a reaction product of a first epihalohydrin and a first polyamidoamine containing one or more secondary amine groups, a first thermoplastic polyamidoamine-epihalohydrin resin that includes a reaction product of a second epihalohydrin and a second polyamidoamine containing one or more secondary amine groups, and one or more re-wetting agents. The first thermosetting polyamidoamine-epihalohydrin resin can have a weight average molecular weight of about 800,000 to about 1,200,000 and a molar ratio of the first epihalohydrin to the secondary amine groups of about 0.002:1 to about 0.1:1. The first thermoplastic polyamidoamine-epihalohydrin resin can have a weight average molecular weight of about 40,000 to about 200,000 and a molar ratio of the second epihalohydrin to the secondary amine groups of about 0.001:1 to about 0.1:1.

17 Claims, No Drawings ered by hot air impinging on the exposed side of the paper and conductive heat is transferred from the drum. As the paper dries, hydrogen bonds form between the fibers creating a flat and dense web morphology. The paper is then scraped backwardly upon itself and off of the Yankee dryer by means of a flexible blade, called a "doctor" blade or a "creping" blade. This creping process causes a substantial number of inter-fiber bonds to break, altering the physical-chemical characteristics of the web and increasing the perceived softness of the resulting creped product.

CREPING ADHESIVES AND METHODS FOR MAKING AND USING SAME

CROSS-REFERENCE TO RELATED APPLICATION

This application claims priority to U.S. Provisional Patent Application having Ser. No. 61/901,094, filed on Nov. 7, 2013, which is incorporated by reference herein.

BACKGROUND

Field

Embodiments described generally relate to creping adhesives and methods for making and using same. More particularly, such embodiments relate to creping adhesives that include one or more thermosetting polyamidoamine-epihalohydrin resins and one or more thermoplastic polyamidoamine-epihalohydrin resins and methods for making and using same.

Description of the Related Art

The manufacture of paper is generally carried out by producing an aqueous slurry of cellulosic fibers and a variety of chemicals and subsequently removing most of the water to form a thin paper web. The structural integrity of the paper arises in large part from the mechanical entanglement of the cellulosic fibers in the web and hydrogen bonds that form between the cellulosic fibers. With paper intended for use as tissue and towel products such as facial tissue, bathroom tissue, paper towels, and napkins, the level of structural integrity arising from the paper-making process conflicts somewhat with the degree of perceived softness that is necessary for consumer acceptance of such products. The most common method of increasing the perceived softness of tissue and towel products is to "crepe" the paper. The creping action can impart a fine, rippled texture to the sheet, increase the bulk of the sheet, improve softness of the sheet, and/or improve absorbency of the sheet. Creping can be accomplished by affixing the moist, cellulosic paper web to a rotating thermal drum commonly known as a Yankee dryer, by applying the web onto the surface of the dryer, which has been sprayed with a creping adhesive, generally in the form of an aqueous solution, emulsion, or dispersion. The surface of the Yankee dryer is continuously sprayed with the creping adhesive while the cellulosic web is applied and dried by hot air impinging on the exposed side of the paper and conductive heat is transferred from the drum. As the paper dries, hydrogen bonds form between the fibers creating a flat and dense web morphology. The paper is then scraped backwardly upon itself and off of the Yankee dryer by means of a flexible blade, called a "doctor" blade or a "creping" blade. This creping process causes a substantial number of inter-fiber bonds to break, altering the physical-chemical characteristics of the web and increasing the perceived softness of the resulting creped product.

The art of obtaining good crepe quality relies on maintaining the proper level of adhesion between the paper web and the surface of the Yankee dryer. Inadequate adhesion can result in poor or non-existing creping or require lower speed operation due to slow drying, while excessive adhesion can lead to poor sheet quality or cause the sheet to break. Cellulosic webs that are insufficiently adhered to the Yankee dryer can impact the control of the web as it travels between the creping blade and the winder upon which a roll of the paper is being formed, causing problems in forming a uniform roll of paper. For example, a loose sheet between the creping blade and the roll can cause wrinkles, foldovers, and weaving of the edges of the sheet in the rolled-up paper, adversely affecting subsequent operations of paper manufacture. Release aids can alter the properties of the adhesive and further provide lubrication to the doctor blade, and influence the release of the paper web from the Yankee dryer, all of which can affect the properties of the creped product. Considerable effort has been spent trying to adjust the balance between the adhesion and the release of the web, while maintaining other conventional parameters that influence the creping process, such as web wetness and creping blade angle. A significant drawback with the existing creping adhesives is that the formulations of the creping adhesives generally need to be changed or adjusted when the wet end chemistry is changed (pH, reactive chemicals, debounders, etc.), the temperature profile is modified, or the residual moisture in the paper web is modified.

There is a need, therefore, for improved creping adhesives that can provide more control over the adhesion/release balance of the paper web to/from the surface of the dryer and methods for making and using same.

SUMMARY

Creping adhesives and methods for making and using same are provided. In at least one specific embodiment, the creping adhesive can include a first thermosetting polyamidoamine-epihalohydrin resin that includes a reaction product of a first epihalohydrin and a first polyamidoamine containing one or more secondary amine groups, a first thermoplastic polyamidoamine-epihalohydrin resin that includes a reaction product of a second epihalohydrin and a second polyamidoamine containing one or more secondary amine groups, and one or more re-wetting agents. The first thermosetting polyamidoamine-epihalohydrin resin can have a weight average molecular weight of about 800,000 to about 1,200,000, about 2 moles to about 500 moles of reactive groups per mole of the first thermosetting polyamidoamine-epihalohydrin resin, and a molar ratio of the first epihalohydrin to the secondary amine groups in the first polyamidoamine of about 0.002:1 to about 0.1:1. The reactive groups of the first thermosetting polyamidoamine-epihalohydrin resin be azetidinium groups, pendant halogroups, or both. The first thermoplastic polyamidoamine-epihalohydrin resin can have a weight average molecular weight of about 40,000 to about 200,000 and a molar ratio of the second epihalohydrin to the secondary amine groups in the second polyamidoamine of about 0.001:1 to about 0.1:1. The creping adhesive can include about 5 wt % to about 80 wt % of the first thermosetting polyamidoamine-epihalohydrin resin, about 15 wt % to about 90 wt % of the first thermoplastic polyamidoamine-epihalohydrin resin, and about 0.1 wt % to about 30 wt % of the one or more re-wetting agents, where all weight percent values are based on the combined weight of the first thermosetting polyamidoamine-epihalohydrin resin, the first thermoplastic polyamidoamine-epihalohydrin resin, and the one or more re-wetting agents.

In at least one specific embodiment, the method for creping a cellulosic fiber web can include applying the creping adhesive to a drying surface. The method can also include adhering a cellulosic fiber web to the drying surface with the creping adhesive. The method can further include dislodging the adhered cellulosic fiber web from the drying surface.

In at least one specific embodiment, a creped product can include the creping adhesive. The creping adhesive can be an adhesive that has been at least partially cured.

DETAILED DESCRIPTION

It has been has been surprisingly and unexpectedly discovered that mixtures of one or more thermosetting polyamidoamine-epihalohydrin resins or "thermosetting PAE resins," one or more thermoplastic polyamidoamine-epicholorohydrin resins or "thermoplastic PAE resins," and one or more re-wetting agents can provide or produce a creping adhesive that can significantly improve heat transfer to the paper web and lubrication between the doctor blade and/or the surface of the Yankee dryer, and/or exhibit a significantly improved durability and/or re-wettability. The creping adhesive, when applied to the surface of the dryer, can also develop significantly higher levels of both wet tack and dry tack. Durability is a characteristic of how stable the creping adhesive coating is on the surface of the Yankee dryer, particularly at the pressure nip. If the coating is easily washed off, it does not protect the creping cylinder and leads to excessive creping blade wear. A soft, but durable coating is preferred. Re-wettability of the creping adhesive refers to how well the residual coating of the creping adhesive on the surface of the Yankee dryer accepts water without washing off. For example, the creping adhesive can be used for a wide range of wet end chemistry conditions (pH, reactive chemicals, debounders, etc.), a wide range of temperature profiles, and/or a wide range of residual moisture encountered during a creping operation without requiring an adjustment or change in the composition of the creping adhesive.

The creping adhesive can have a swelling index from a low of about 5 grams water per gram crosslinked polymer, about 15 grams water per gram crosslinked polymer, about 25 grams water per gram crosslinked polymer or about 50 grams water per gram crosslinked polymer to a high of about 100 grams water per gram crosslinked polymer, about 150 grams water per gram crosslinked polymer, about 200 grams water per gram crosslinked polymer or about 250 grams water per gram crosslinked polymer, as measured after extraction in a Soxhlet extractor with boiling water for 75 minutes. For example, the creping adhesive can have a swelling index of about 10 grams water per gram crosslinked polymer to about 75 grams water per gram crosslinked polymer, about 30 grams water per gram crosslinked polymer to about 120 grams water per gram crosslinked polymer about 60 grams water per gram crosslinked polymer to about 160 grams water per gram crosslinked polymer, about 110 grams water per gram crosslinked polymer to about 175 grams water per gram crosslinked polymer, or about 160 grams water per gram crosslinked polymer to about 240 grams water per gram crosslinked polymer, as measured after extraction in a Soxhlet extractor with boiling water for 75 minutes. In another example, the creping adhesive can have a swelling index of at least 5 grams water per gram crosslinked polymer, at least 20 grams water per gram crosslinked polymer, at least 40 grams water per gram crosslinked polymer, at least 60 grams water per gram crosslinked polymer, at least 80 grams water per gram crosslinked polymer, at least 100 grams water per gram crosslinked polymer, or at least 120 grams water per gram crosslinked polymer to about 250 grams water per gram crosslinked polymer, as measured after extraction in a Soxhlet extractor with boiling water for 75 minutes.

The creping adhesive can have a total solids concentration (also referred to as insoluble material or crosslinked polymer) from a low of about 1 wt %, about 10 wt %, about 20 wt %, about 30 wt %, about 40 wt %, about 50 wt %, or about 65 wt % to a high of about 75 wt %, about 80 wt %, about 85 wt %, about 90 wt %, about 95 wt %, or about 100 wt %. In another example, the creping adhesive can have a total solids concentration from about 5 wt % to about 25 wt %, about 10 wt % to about 20 wt %, about 20 wt % to about 30 wt %, about 15 wt % to about 25 wt %, about 20 wt % to about 50 wt %, about 35 wt % to about 60 wt %, about 45 wt % to about 85 wt %, or about 60 wt % to about 90 wt %. As understood by those skilled in the art, the solids content of the creping adhesive can be measured by determining the weight loss upon heating a small sample, e.g., 1-5 grams of the creping adhesive, to a suitable temperature, e.g., 120° C., and a time sufficient, e.g., 2 hours, to remove liquid therefrom.

The creping adhesive can have a pH from a low of about 2, about 2.5, about 3, about 3.5, or about 4 to a high of about 6, about 6.5, about 7, about 7.5, about 8, or about 9. For example, the creping adhesive can have a pH of about 2 to about 8.5, about 2 to about 8, about 2.3 to about 5.5, about 3.5 to about 4.5, about 4 to about 6, about 4 to about 8, about 3 to about 7, or about 5 to about 7. In another example, the creping adhesive can have a pH of less than 8, less than 7.5, less than 7, less than 6.5, less than 6, less than 5.5, less than 5, or less than 4.5. One or more mineral acids and/or one or more organic acids can be mixed or otherwise combined with the creping adhesive to adjust the pH thereof. Illustrative acids can include, but are not limited to, hydrochloric acid, sulfuric acid, methanesulfonic acid, nitric acid, formic acid, phosphoric acid, acetic acid, citric acid, lactic acid, lactobionic acid, or any mixture thereof. The re-wetting properties of the first thermosetting PAE resin can be modified by the amount and the particular type of acid used to stabilize the first thermosetting PAE resin.

Suitable thermosetting PAE resins can be prepared by reacting one or more polyamidoamines and one or more epihalohydrins. The thermosetting PAE resin can also be referred to as the "first thermosetting PAE resin." If the creping adhesive includes additional thermosetting PAE resins, the additional thermosetting PAE resin(s) can be sequentially referred to as the "second thermosetting PAE resin," the "third thermosetting PAE resin," and so on. The first polyamidoamine can be prepared by reacting (1) one or more first dicarboxylic acids and/or one or more first esters of a dicarboxylic acid and (2) one or more first polyamines. The first polyamine can include secondary and/or tertiary amine groups. The first dicarboxylic acid can be a saturated aliphatic dibasic carboxylic acid, often containing from about 3 to about 10 carbon atoms and mixtures thereof. Dicarboxylic acids containing from 4 to 8 carbon atoms chains can be used, such as adipic acid and/or glutaric acid. Illustrative first dicarboxylic acids can include, but are not limited to, malonic acid, succinic acid, glutaric acid, adipic acid, suberic acid, sebacic acid, or any mixture thereof. Illustrative first esters of dicarboxylic acids can include, but are not limited to, dimethyl glutarate, diethyl glutarate, dimethyl adipate, diethyl adipate, or any mixture thereof. Illustrative first epihalohydrins can include, but are not limited to, epichlorohydrin, epibromohydrin, epifluorohydrin, epiiodohydrin, or any mixture thereof.

The first polyamine reacted with the first dicarboxylic acid and/or first ester of a dicarboxylic acid to produce the polyamidoamine can include, but is not limited to, one or more polyalkylene polyamines. The polyalkylene polyamines can include compounds of Formula (I).

$$H_2N[(CH_2)_xNH]_yH \qquad (I)$$

where x and y are integers independently selected from 2 to 10. Specific examples polyalkylene polyamine can include, diethylenetriamine (x=2, y=2), triethylenetetramine (x=2, y=3), tripropylenetetramine (x=3, y=3) tetraethylenepentamine (x=2, y=4), and pentaethylenehexamine (x=2, y=5). Other examples of polyamines can include methyl bis(3-aminopropyl)-amine, dipropylenetriamine, bis(hexamethylene)triamine, bis-2-hydroxyethyl ethylenediamine. The polyamidoamine can include one or more secondary amine groups. For example, the polyamidoamine can include one or more secondary amine groups derived from a polyalkylene polyamine.

The first polyamine can be or include a mixture of two or more polyamines. If the first polyamine includes two or more polyamines, each polyamine can be present in the same concentration or different concentrations with respect to one another. For example, the first polyamine can include two polyamines at a weight ratio of about 99:1, about 90:10, about 80:20, about 70:30, about 60:40, about 50:50, about 40:60, about 30:70, about 20:80, about 10:90, or about 1:99 with respect to one another. Similarly, if three or more polyamines are mixed, the three or more polyamines can be present in any ratio with respect to one another.

The polyamidoamine of the first dicarboxylic acid and the first polyamine can be prepared by heating a mixture of the reactants to a temperature of about 110° C. to about 250° C. For example, the mixture of the dicarboxylic acid and the polyamine can be heated to a temperature from a low of about 110° C., about 125° C., about 140° C. to a high of about 160° C., about 175° C., about 190° C., or about 200° C. at atmospheric pressure.

In carrying out the reaction between the first polyamine and the first dicarboxylic acid, the amount of the first dicarboxylic acid can be sufficient to react substantially completely with the primary amine groups of the polyalkylene polyamine but insufficient to substantially react with the secondary amine groups of the polyamine. The molar ratio of the first polyamine to the first dicarboxylic acid can be from a low of about 0.8:1, about 0.85:1, about 0.9:1, about 0.95:1, or about 1:1 to a high of about 1:1, about 1.05:1, about 1.1:1, about 1.2:1, about 1.3:1, or about 1.4:1. For example, the molar ratio of the first polyamine to the first dicarboxylic acid can be about 0.8:1 to about 1.4:1, about 0.9:1 to about 1.2:1, about 0.9:1 to about 1:1, about 1:0.95 to about 1:1.05, about 1:0.9 to about 1:1.1, about 1:0.85 to about 1:1.1, or about 0.95:1 to about 1.05:1.

If the reaction between the first polyamine and the first dicarboxylic acid is carried out under a reduced pressure the reaction temperature can be reduced to about 75° C. to 150° C. The time of reaction can depend, at least in part, on the temperature and/or pressure and can generally be from about 0.5 hours to about 4 hours. The reaction can be continued to substantial completion. The reaction between the first polyamine and the first dicarboxylic acid can produce water as a byproduct, which can be removed by distillation. At the end of the reaction, the resulting product can be dissolved or dispersed in water to provide any desired concentration such as an aqueous polyamidoamine resin having about 50 wt % total resin solids.

When a first ester of a dicarboxylic acid is used instead of dicarboxylic acid for reaction with the polyamine, the pre-polymerization can be conducted at a lower temperature, such as about 100° C. to about 175° C. at atmospheric pressure. In this case, the byproduct can be an alcohol, the type of alcohol depending upon the identity of the diester. For example, if a dimethyl ester is used as a reactant, the alcohol byproduct can be methanol. In another example, if a diethyl ester is used as a reactant, the alcohol byproduct can be ethanol. The molar ratio between the first polyamine and the first diester can be the same as the ratio between the first polyamine and the first dicarboxylic acid. If the reaction between the polyalkylene polyamine and the diester is carried out under a reduced pressure the reaction temperature can be reduced to about 75° C. to about 150° C.

The first polyamidoamine that can be used for producing the first thermosetting PAE resin can be produced under conditions leading to the formation of a pre-polymer composition having a weight average molecular weight (in Daltons) of about 10,000 and up to about 300,000. For example, the polyamidoamine can have a weight average molecular weight from a low of about 10,000, about 20,000, about 25,000, about 30,000, about 40,000, or about 50,000 to a high of about 65,000, about 75,000, about 100,000, about 200,000, about 250,000, about 275,000, or about 300,000.

As known by those skilled in the art, resin molecular weights, e.g., weight average molecular weight, number average molecular weight, and z-average molecular weight, can be determined using Gel Permeation Chromatography (GPC). A suitable GPC method can use tetrahydrofuran as a solvent/diluent and a system of two mixed C chromatographic columns preceding a 500 Angstroms PL gel column, all available from Resin Laboratories (now part of Varian, Inc.). The column arrangement can be calibrated using a range of polystyrene standards. For determining the molecular weight of a particular resin sample, the sample can be injected along with polystyrene having a molecular weight of 250,000 and toluene as an internal standard. A Model 759A Absorbance Detector from Applied Biosystems can be used to monitor the column output and assist the molecular weight determination. The method of determining the molecular weight of a resin sample is well understood by those skilled in the art and other configurations and reference materials can conveniently be used.

To produce the first thermosetting PAE resin, the amount of the first epihalohydrin reacted with the first polyamidoamine can be controlled or limited. For example, the molar ratio of the first polyamidoamine to the first epihalohydrin can be from a low of about 0.75:1, about 0.8:1, about 0.85:1, about 0.9:1, about 0.95:1, or about 1:1 to a high of about 1.2:1, about 1.4:1, about 1.6:1, about 1.8:1, or about 2:1. In another example, the molar ratio of the first polyamidoamine to the first epihalohydrin can be from about 0.75:1 to about 2:1, about 0.9:1 to about 1.1:1, about 0.8:1 to about 1.5:1, about 1.1:1 to about 1.7:1, about 1.4:1 to about 1.9:1, or about 0.95:1 to about 1.7:1.

The first thermosetting PAE resin can have a molar ratio of the first epihalohydrin to the secondary amine groups in the first polyamidoamine (moles epihalohydrin to moles secondary amine groups) from a low of about 0.002:1, about 0.004:1, about 0.006:1 about 0.008:1, or about 0.01:1 to a high of about 0.03:1, about 0.05:1, about 0.07:1, about 0.08:1, or about 0.1:1. For example, the first thermosetting PAE resin can have a molar ratio of the first epihalohydrin to the secondary amine groups in the polyamidoamine from about 0.002:1 to about 0.1:1, about 0.03:1 to about 0.007:1, about 0.005:1 to about 0.06:1, about 0.008:1 to about 0.015:1, about 0.009:1 to about 0.09:1. In another example, the first thermosetting PAE resin can have a molar ratio of the first epihalohydrin to the secondary amine groups in the first polyamidoamine of at least 0.002:1, at least 0.003:1, at least 0.004:1, at least 0.005:1, at least 0.006:1, at least 0.007:1, at least 0.008:1, at least 0.009:1, at least 0.01:1, at least 0.015:1, at least 0.02:1, at least 0.025:1, or at least 0.03:1 and up to about 0.05:1, about 0.07:1, about 0.09:1, or about 0.1:1.

The first polyamidoamine can be reacted with the first epihalohydrin at a temperature from a low of about 0° C., about 10° C., about 20° C., about 25° C., about 30° C., or about 35° C. to a high of about 60° C., about 70° C., about 80° C., about 90° C., or about 100° C. The reaction between the first polyamidoamine and the first epihalohydrin can be carried out in as an aqueous solution to moderate or otherwise control the reaction. Although not necessary, pH adjustment can be done to increase or decrease the rate of residual crosslinking.

The reaction between the first polyamidoamine and the first epihalohydrin can be carried out until a viscosity of about C or higher on the Gardener-Holdt scale of a 20% solids solution at a temperature of 25° C. is reached. The extent of reaction between the first polyamidoamine and the first epihalohydrin can be controlled so that the polyamidoamine is only partially reacted with the epihalohydrin. The viscosity, measured using a Brookfield viscometer, for a 15 wt % solids solution generally can be limited so as not to exceed about 150 centipoise (cP) (about FG on the Gardner Holdt scale) at a temperature of 25° C. The Brookfield viscosity of the 15 wt % solids solution can be at least 5 cP (a viscosity of about A4 on the Gardner Holdt scale) at a temperature of 25° C. For example, the Brookfield viscosity of the 15 wt % solids solution can be between about 10 cP and about 60 cP (a viscosity of about A3 to AB on the Gardner Holdt scale) at a temperature of 25° C. In another example, the Brookfield viscosity of the 15 wt % solids solution can be about 12 cP to about 25 cP (a viscosity of about A3 to A2 on the Gardner Holdt scale) at a temperature of about 25° C. Preferably, the reaction can be controlled such that it does not progress beyond the point where the viscosity, measured using a Brookfield viscometer, of a 20% solids solution at a temperature of about 25° C. reaches about 25 cP to about 45 cP (a viscosity of about A2 to A1a on the Gardner Holdt scale). In another example the reaction can be controlled such that a 20% solids solution at a temperature of about 25° C. has a viscosity of about 35 cP or less, or 30 cP or less, or 25 cP or less (a viscosity of about A2-A1 on the Gardner Holdt scale).

When the desired viscosity is reached, sufficient water can be added to adjust the solids content of the first thermosetting PAE resin to a desired amount. For example, the first thermosetting PAE resin can have a solids concentration from a low of about 5 wt %, about 10 wt %, or about 15 wt % to a high of about 20 wt %, about 30 wt %, about 40 wt %, about 60 wt %, about 80 wt %, about 90 wt %, or about 95 wt %. The first thermosetting PAE resin can be cooled to a temperature of about 25° C. In another example the first thermosetting PAE resin can have a solids concentration from a low of about 8 wt %, about 10 wt %, about 12 wt % or about 14 wt % to a high of about 22 wt %, about 25 wt %, about 27 wt %, or about 30 wt %. In another example, the first thermosetting PAE resin can be in the form of an aqueous dispersion, suspension, or solution and have a solids concentration greater than about 20 wt % to about 50 wt %.

The ability of the first thermosetting PAE resin (and any other thermosetting PAE resins such as a second thermosetting PAE resin) to resist gelation can be controlled by adding sufficient acid to reduce the pH to less than 8, less than 7.5, less than 7, less than 6.5, less than 6, less than 5.5, less than 5, less than 4.5, or less than 4. Illustrative acids can include, but are not limited to, hydrochloric acid, sulfuric acid, methanesulfonic acid, nitric acid, formic acid, phosphoric acid, acetic acid, or any mixture thereof. The re-wetting properties of the first thermosetting PAE resin can be modified by the amount and the particular type of acid used to stabilized the first thermosetting PAE resin.

The weight average molecular weight of the first thermosetting PAE resin can be from a low of about 800,000, about 825,000, about 850,000, about 875,000, about 900,000, or about 950,000 to a high of about 1,000,000, about 1,050,000, about 1,100,000, about 1,150,000, or about 1,200,000. For example, the weight average molecular weight of the thermosetting resin can be about 800,000 to about 1,200,000, about 820,000 to about 1,100,000, about 825,000 to about 975,000, about 900,000 to about 1,150,000, about 1,000,000 to about 1,200,000, or about 850,000 to about 1,150,000. In another example, the first thermosetting PAE resin can have a weight average molecular weight of at least 800,000, at least 825,000, at least 850,000, at least 875,000, at least 900,000, at least 9,250,000, at least 950,000, at least 975,000, at least 1,000,000, or at least 1,050,000 and up to about 1,100,000, about 1,125,000, about 1,150,000, about 1,175,000, or about 1,200,000.

The reactivity of the first thermosetting PAE resin can be expressed as the ratio of moles of reactive groups per mole of the first thermosetting PAE resin. The reactive groups in the first thermosetting PAE resin can be or include an azetidinium group, pendant halo-groups such as chlorogroups, or both. The ratio of the moles of reactive groups per mole of the first thermosetting PAE resin can be from a low of about 2:1, about 5:1, about 10:1, about 25:1, about 50:1, about 75:1, about 100:1, about 125:1, or about 150:1 to a high of about 200:1, about 250:1, about 300:1, about 350:1, about 400:1, about 450:1, about 475:1, or about 500:1. For example, the ratio of the moles of reactive groups per mole of the first thermosetting PAE resin can be from about 2:1 to about 500:1, about 40:1 to about 180:1, about 80:1 to about 260:1, about 120:1 to about 320:1, about 260:1 to about 380:1, about 320:1 to about 440:1, about 360:1 to about 480:1, or about 410:1 to about 500:1. In another example, molar ratio of the reactive groups to moles of the first thermosetting PAE resin can be at least 2:1, at least 10:1, at least 30:1, at least 60:1, at least 80:1, at least 100:1, at least 120:1, at least 140:1, at least 160:1, at least 180:1, at least 200:1, at least 220:1, at least 240:1, or at least 260:1 and up to about 300:1, about 350:1, about 400:1, about 450:1, or about 500:1.

The first thermosetting PAE resin can have a viscosity from a low of about 5 cP, about 10 cP, about 20 cP, about 40 cP, or about 60 cP to a high of about 100 cP, about 125 cP, about 150 cP, about 175 cP, or about 200 cP at a temperature of about 25° C. For example, the first thermosetting PAE resin can have a viscosity from a low of about 5 cP, about 10 cP, about 20 cP, about 40 cP, or about 60 cP to a high of about 100 cP, about 125 cP, about 150 cP, about 175 cP, or about 200 cP at a temperature of about 25° C. and a solids concentration of about 15 wt %. The viscosity of the first thermosetting PAE resin and other PAE resins can be measured using a Brookfield Viscometer at a temperature of 25° C. For example, the Brookfield Viscometer can be equipped with a small sample adapter such a 10 mL adapter and the appropriate spindle to maximize torque such as a spindle no. 31.

The first thermosetting PAE resin can have a measurable covalent halogen and ionic halogen functionality and exhibit a noticeable change in properties when heated to a temperature of about 105° C. to about 150° C. In the first thermosetting PAE resin, the epihalohydrin can be only partially reacted such that one of the two reactive sites of the epihalohydrin remains available for further reaction. In the context of epichlorohydrin, the two reactive sites are the epoxide moiety and the alkyl chloride moiety. In the first thermosetting PAE resin there can be some crosslinks between resin chains and some pendant reactive halohydrin residues along the backbone of the first thermosetting PAE resin. For example, there can be a measureable level of covalent halogen, such as chlorine, due to and in proportion to the pendant halohydrin groups.

The first thermosetting PAE resin can have a latent level of reactivity as a function of the pendant halohydrin functionality. As the name implies, the first thermosetting PAE resin can be self-crosslinkable or thermosetting without the need for any catalyst, crosslinker, or other additional compound. The first thermosetting PAE resin can generally include both secondary or tertiary amine moieties and reactive halohydrin groups present in the same molecule and/or in different molecules. The tertiary amine moieties are found where there are existing crosslinks.

When the first thermosetting PAE resin is heated, pendant halohydrin moieties can react with secondary amine moieties to convert them to tertiary amines, thus increasing the molecular weight of the resin. The aqueous solution of the first thermosetting PAE resin can be treated with any number of organic or inorganic acids to impart different water durability characteristics to dried films of the resin. Typical acids employed can include, but are not limited to, sulfuric, phosphoric, formic, hydrochloric, or acetic acids, or any mixture thereof. Because of its latent reactivity, the molecular weight of the first thermosetting PAE resin can be modified in a controlled manner, which can be used to adjust its water solubility and its adhesive performance as part of the creping adhesive.

When the first epihalohydrin is epichlorohydrin, the first thermosetting PAE resin can have a total chlorine concentration from a low of about 0.1 wt %, about 0.5 wt %, about 1 wt %, about 1.5 wt %, about 2 wt %, about 2.5 wt %, or about 3 wt % to a high of about 5 wt %, about 6 wt %, about 7 wt %, about 8 wt %, about 9 wt %, or about 10 wt % based on the solids content of the first thermosetting PAE resin. The chlorine concentration can include ionic chlorine (chlorine bound via crosslinks) and covalent chlorine (pendant halohydrin).

When the first epihalohydrin is epichlorohydrin, the ratio (either mole or weight basis) of the covalent chlorine (pendant halohydrin) to the ionic chlorine (chlorine bound via crosslinks) in the first thermosetting PAE resin can be from about 0.01:1 to about 100:1. For example, the ratio of the covalent chlorine to the ionic chlorine can be about 0.05:1 to about 10:1, about 0.05:1 to about 7.5:1, about 0.05:1 to about 7:1, about 0.1:1 to about 6:1, about 0.2:1 to about 5:1, about 0.25:1 to about 2.5:1, or about 0.5:1 to about 1.5:1.

When the first epihalohydrin is epichlorohydrin, the first thermosetting PAE resin can have a covalent chlorine content from a low of about 0.02 wt % about 0.05 wt %, about 0.1 wt %, about 0.5 wt %, about 1 wt %, about 1.5 wt %, about 2 wt %, about 2.5 wt %, or about 3 wt % to a high of about 5 wt %, about 6 wt %, about 7 wt %, about 8 wt %, about 9 wt %, or about 10 wt % based on the total solids content of the first thermosetting PAE resin. For example, the first thermosetting PAE resin can have a covalent chlorine concentration from a low of about 0.01 wt %, about 0.05 wt %, about 0.1 wt %, about 0.3 wt %, or about 0.5 wt % to a high of about 1 wt %, about 1.2 wt %, about 1.35 wt %, about 1.4 wt %, or about 1.5 wt % based on the total solids content of the first thermosetting PAE resin.

When the first epihalohydrin is epichlorohydrin, the first thermosetting PAE resin can have a an ionic chlorine concentration from a low of about 0.05 wt %, about 0.1 wt %, about 0.3 wt %, about 0.5 wt %, or about 0.7 wt % to a high of about 1 wt %, about 1.2 wt %, about 1.35 wt %, about 1.4 wt %, or about to 1.5 wt %. In one or more embodiments, the first thermosetting PAE resin can have a total chlorine content of about 0.1 wt % to about 8 wt % and a covalent chlorine content of about 0.1 wt % to about 6 wt % based on the total solids content of the first thermosetting PAE resin.

The first thermosetting PAE resin can be free from any secondary amines. The first thermosetting PAE resin can have a secondary amine concentration from a low of about 0.01 mmols, about 0.05 mmols, about 0.07 mmols, about 0.1 mmols, about 0.15 mmols, about 0.2 mmols, about 0.3 mmols, about 0.4 mmols, about 0.5 mmols, about 0.7 mmols, about 0.8 mmols, about 0.9 mmols, or about 1 mmol to a high of about 2 mmols, about 2.5 mmols, about 3 mmols, about 3.5 mmols, about 4 mmols, about 4.5 mmols, or about 5 mmols per gram of the first thermosetting PAE resin. For example, the first thermosetting PAE resin can have a secondary amine concentration of about 0.02 mmols to about 0.14 mmols, about 0.05 mmols to about 0.2 mmols, about 0.06 mmols to about 0.22 mmols, about 0.2 mmols to about 0.3 mmols, about 0.14 mmols to about 0.38 mmols, about 0.32 mmols to about 0.6 mmols, about 0.5 mmols to about 1.5 mmols, about 1.3 mmols to about 2.8 mmols, about 1.6 mmols to about 3.4 mmols, about 2.2 mmols to about 3.6 mmols, about 2.6 mmols to about 4.2 mmols, about 3.2 mmols to about 4.8 mmols, or about 0.01 mmols to about 5 mmols per gram of the first thermosetting PAE resin.

The first thermosetting PAE resin can be made using any desired method. For example, one can simply synthesize a single PAE resin composition that itself constitutes the first thermosetting PAE resin by using an appropriate amount of the first polyamidoamine and the first epihalohydrin and allowing the reaction to proceed until an intended balance of covalent chlorine and ionic chlorine is reached in the first thermosetting PAE resin. Alternatively, one can blend different PAE resins having different levels of covalent chlorine and/or ionic chlorine to arrive at a composition having the intended balance between covalent chlorine and ionic chlorine. For example, one can blend a fully crosslinked PAE resin in which the covalent chlorine and the ionic chlorine are substantially the same, with a PAE resins that is lightly or not fully crosslinked, if at all, where the total chlorine is substantially or all due to ionic chlorine. Other options for blending PAE resins within the spectrum of different levels of crosslinking and different levels of reactivity will be apparent to those of ordinary skill in the art in view of the present disclosure.

The first thermosetting PAE resin can have an increase in its glass transition temperature ($T_g$) after every heating/cooling cycle with a corresponding increase in film adhesion (by Peel Adhesion) and an increase in its non-water-soluble fraction. Also, mild heating of a sample of the first thermosetting PAE resin can exhibit a substantial increase in solution viscosity and/or resin molecular weight over time, which does not occur with a non-reactive, fully crosslinked resin. As such, the first thermosetting PAE resin can possess an adjustable adhesion level and/or an adjustable water resistance. The use of the thermoplastic PAE resin can significantly enhance the adjustable adhesion level and/or the adjustable water resistance of the first thermosetting PAE resin.

The first thermosetting PAE resin can exhibit sufficient reactivity at about 0.02 moles to about 0.5 moles of reactive groups per mol of repeating unit and a molecular weight between 800,000 and 1,200,000. The concentration of the secondary amine in the thermosetting PAE resin can be about 0.1 mmols per gram to about 5 mmol per gram of the thermosetting PAE resin.

The re-wettability of the film of the creping adhesive can depend, at least in part, on the number of hydrophilic groups (such as protonated amines per gram of resin) and how easy the water has access to them. The water access can be designed through the length and density of the resin branches. The number of hydrophilic groups is set by the dicarboxylic acid used in polycondensation (adipic and glutaric).

The thermoplastic PAE resin can also be referred to as the "first thermoplastic PAE resin." If the creping adhesive includes additional thermoplastic PAE resins, the additional thermoplastic PAE resin(s) can be sequentially referred to as the "second thermoplastic PAE resin," the "third thermoplastic PAE resin," and so on. In contrast, to thermosetting PAE resins, the thermoplastic PAE resin can be free from or not exhibit a substantial change in properties when heated to a temperature of about 105° C. to about 150° C. The glass transition point ($T_g$) of the first thermoplastic PAE resin can remain virtually unchanged after repeated heating/cooling cycles. The properties of the first thermoplastic PAE resin can be, at least in part, limited by its molecular weight. The first thermoplastic PAE resin can essentially have no pendant halohydrin groups and, when the epihalohydrin used to make the first thermoplastic PAE resin is epichlorohydrin, all of the titratable chloride can be ionic in nature. The first thermoplastic PAE resin can have a ratio of covalent chlorine to ionic chlorine of less than 0.1:1, less than 0.05:1, less than 0.01:1, or less than 0.005:1.

Suitable first thermoplastic PAE resins can be produced by a reaction between one or more second polyamidoamines and one or more second epihalohydrins. The molar ratio of the second polyamidoamine to the second epihalohydrin can be from a low of about 2:1, about 3:1, about 5:1, about 7:1, about 10:1, or about 15:1 to a high of about 25:1, about 35:1, about 50:1, about 75:1, or about 100:1. In another example, the molar ratio of the second polyamidoamine to the second epihalohydrin can be from about 2:1 to about 100:1, about 4:1 to about 20:1, about 10:1 to about 30:1, about 20:1 to about 55:1, about 30:1 to about 65:1, or about 45:1 to about 85:1.

The reactants that can be used to produce the second polyamidoamine can include those discussed and described above with reference to the first thermosetting PAE resin. The second polyamidoamine can be prepared by reacting (1) one or more second dicarboxylic acids and/or one or more second esters of dicarboxylic acids and (2) one or more second polyamines. The second polyamine can include secondary and/or tertiary amine groups. The second dicarboxylic acid, second ester of a dicarboxylic acid, and second polyamines can include those discussed and described above with reference to making the first thermosetting PAE resin. The first and second dicarboxylic acids, the first and second esters of dicarboxylic acids, and the first and second polyamines can be the same or different with respect to one another. As such, the first thermoplastic PAE resin can have a branched chemical structure similar to the first thermosetting PAE resin, but the first thermoplastic PAE resin can have a much lower molecular weight.

The weight average molecular weight of the first thermoplastic PAE resin can be from a low of about 40,000, about 45,000, about 50,000, about 60,000, about 70,000, or about 80,000 to a high of about 100,000, about 120,000, about 140,000, about 150,000, about 160,000, about 170,000, about 180,000, about 190,000, or about 200,000. For example, the thermoplastic PAE resin can have a weight average molecular weight form about 40,000 to about 200,000, about 55,000 to about 120,000, about 65,000 to about 150,000, about 110,000 to about 180,000, or about 125,000 to about 190,000. In another example, the first thermoplastic PAE resin can have a weight average molecular weight of at least 40,000, at least 45,000, at least 50,000, at least 55,000, at least 60,000, at least 70,000, or at least 80,000 and up to about 100,000, about 120,000, about 140,000, about 150,000, about 160,000, about 170,000, about 180,000, about 190,000, or about 200,000.

The molar ratio of the second polyamine to the second dicarboxylic acid and/or the second ester of a dicarboxylic acid in the first thermoplastic PAE resin can be from a low of about 0.8:1, about 0.85:1, about 0.9:1, about 0.95:1, or about 1:1 to a high of about 1:1, about 1.05:1, about 1.1:1, about 1.2:1, about 1.3:1, or about 1.4:1. For example, the molar ratio of the second polyamine to the second dicarboxylic acid can be about 0.8:1 to about 1.4:1, about 0.9:1 to about 1.2:1, about 0.9:1 to about 1:1, about 1:0.95 to about 1:1.05, about 1:0.9 to about 1:1.1, about 1:0.85 to about 1:1.1, or about 0.95:1 to about 1.05:1.

The first thermoplastic PAE resin can have a secondary amine concentration from a low of about 3 mmols, about 4 mmols, about 4.3 mmols, about 4.5 mmols, about 4.7 mmols, about 5 mmols, about 5.3 mmols, or about 5.5 mmols to a high of about 6 mmols, about 6.3 mmols, about 6.5 mmols, about 6.7 mmols, about 7 mmols, about 7.5 mmols, about 8 mmols, or about 8.5 mmols per gram of the thermoplastic PAE resin. For example, the first thermoplastic PAE resin can have a secondary amine concentration of about 4 mmols to about 5.4 mmols, about 4.6 mmols to about 6.2 mmols, about 5.2 mmols to about 6.6 mmols, about 5.8 mmols to about 7.2 mmols, about 6.4 mmols to about 8 mmols, or about 4 mmols to about 8 mmols per gram of the first thermoplastic PAE resin.

In one or more embodiments, a ratio of the weight average molecular weight of the first thermoplastic PAE resin to the weight average molecular weight of the first thermosetting PAE resin can be from a low of about 0.01:1, about 0.1:1, about 0.5:1, about 1:1, about 3:1, about 5:1, about 10:1, or about 15:1 to a high of about 40:1, about 50:1, about 60:1, about 70:1, about 80:1, about 90:1, or about 100:1. For example, the ratio of the weight average molecular weight of the first thermoplastic PAE resin to the weight average molecular weight of the first thermosetting PAE resin can be from about 0.7:1 to about 10:1, about 4:1 to about 30:1, about 15:1 to about 45:1, about 35:1 to about 65:1, about 55:1 to about 80:1, about 65:1 to about 95:1, or about 10:1 to about 70:1.

The amount of first thermoplastic PAE resin that can be combined with the first thermosetting PAE resin can be varied over a wide range and can be selected to vary the properties of the adhesive composition such as insolubility, re-wettability, density, cross-linking, brittleness, and/or tackiness of the creping adhesive. In this manner, the properties of the creping adhesive can be adjusted so that the creping adhesive can be optimized for a given drier and wood pulp composition. The ability to control these physical properties allows the operator to more precisely control the desired properties of the creping adhesive. In effect, the operator can regulate the desired creping adhesive properties by varying the amount of thermoplastic PAE resin relative to thermosetting PAE resin. In general, for a constant degree of cross-linking by the epihalohydrin, as the concentration of thermoplastic PAE resin increases the insolubility, re-wettability, density, and brittleness tend increase and the degree of tackiness tends to decrease.

The first thermoplastic PAE resin can at least partially attenuate, adjust, or otherwise control the alkylation process (e.g., through the formation of crosslinks by reaction between secondary amine moieties and pendant halohydrin moieties) by reacting with covalent halogen (chlorine) from the first thermosetting PAE resins. Thus, the first thermoplastic PAE resin can be used to control the crosslinking process. Suitable first thermoplastic PAE resins can be capable of reacting with pendant halo groups on the first thermosetting PAE resin. Suitable first thermoplastic PAE resins can also function as plasticizers for the creping adhesive as well. The first thermoplastic PAE resin can be mixed, blended, or otherwise combined with the first thermosetting PAE resin, with a release aid, and/or or independently to the surface of the dryer during the creping process. Blends of different thermoplastic PAE resins also can be used. Other plasticizers, such as diethanol amine, triethanol amine, glycerin, and/or polyglycerin can also be used.

The one or more re-wetting agents can be or include, but are not limited to, one or more protonated amines, one or more protonated polyamines, one or more quaternary ammonium salts, one or more poly-quaternary ammonium salts, glycerin, one or more salts of a polycarboxylic acid neutralized with triethanolamine, one or more phosphates, choline chloride, or any mixture thereof. Illustrative protonated amines and protonated polyamines can include, but are not limited to, amines and polyamines protonated with one or more inorganic and/or one or more organic acids, such as lactic acid, citric acid, lactobionic acid, or any mixture thereof. Illustrative quaternary ammonium salts can include, but are not limited to, diallyldimethylammonium chloride (DADMAC). Illustrative poly-quaternary ammonium salts can include, but are not limited to, poly-diallyldimethylammonium chloride (poly-DADMAC). Illustrative phosphates can include, but are not limited to, phosphoric acid and/or phosphate salts.

The amount of the first thermosetting PAE resin in the creping adhesive can be from a low of about 1 wt %, about 3 wt %, about 5 wt %, about 7 wt %, about 10 wt %, about 15 wt %, about 20 wt %, or about 30 wt % to a high of about 40 wt %, about 50 wt %, about 55 wt %, about 60 wt %, about 65 wt %, about 70 wt %, about 75 wt %, or about 80 wt % based on the combined weight of the first thermosetting PAE resin, the first thermoplastic PAE resin, and the re-wetting agent. For example, the creping adhesive can include the first thermoplastic PAE resin in an amount of about 5 wt % to about 80 wt %, about 15 wt % to about 45 wt %, about 25 wt % to about 65 wt %, about 45 wt % to about 70 wt %, about 60 wt % to about 80 wt %, or about 10 wt % to about 60 wt % based on the combined weight of the first thermosetting PAE resin, the first thermoplastic PAE resin, and the re-wetting agent.

The amount of the first thermoplastic PAE resin in the creping adhesive can be from a low of about 1 wt %, about 3 wt %, about 5 wt %, about 7 wt %, about 10 wt %, about 15 wt %, about 20 wt %, or about 30 wt % to a high of about 60 wt %, about 65 wt %, about 70 wt %, about 75 wt %, about 80 wt %, about 85 wt %, or about 90 wt % based on the combined weight of the first thermosetting PAE resin, the first thermoplastic PAE resin, and the re-wetting agent. For example, the creping adhesive can include the first thermoplastic PAE resin in an amount of about 3 wt % to about 90 wt %, about 15 wt % to about 45 wt %, about 25 wt % to about 65 wt %, about 45 wt % to about 85 wt %, about 60 wt % to about 90 wt %, or about 10 wt % to about 70 wt % based on the combined weight of the first thermosetting PAE resin, the first thermoplastic PAE resin, and the re-wetting agent.

The amount of the re-wetting agent in the creping adhesive can be from a low of about 1 wt %, about 3 wt %, about 5 wt %, or about 7 wt % to a high of about 15 wt %, about 20 wt %, about 25 wt %, or about 30 wt %, based on the combined weight of the first thermosetting PAE resin, the first thermoplastic PAE resin, and the re-wetting agent. For example, the creping adhesive can include from about 1 wt % to about 30 wt %, about 5 wt % to about 15 wt %, about 2 wt % to about 8 wt %, about 6 wt % to about 20 wt %, about 10 wt % to about 24 wt %, about 16 wt % to about 28 wt %, or about 18 wt % to about 30 wt % of the re-wetting agent, based on the combined weight of the first thermosetting PAE resin, the first thermoplastic PAE resin, and the re-wetting agent.

In one or more embodiments, the creping adhesive can include the first thermosetting PAE resin, the first thermoplastic PAE resin, and one or more additional PAE resins, where the additional PAE resin(s) differs from the first thermosetting PAE resin and the first thermoplastic PAE resin. For example, the first thermosetting PAE resin differs from the first thermoplastic resin by having a different weight average molecular weight and/or different reactivity. The additional PAE resin(s) can also differ from the first thermosetting PAE resin and the first thermoplastic PAE resin by at least one of the weight average molecular weight and reactivity.

In at least one specific embodiment, the creping adhesive can include the first thermosetting PAE resin, the first thermoplastic PAE resin, and a third PAE resin. The third PAE resin can be a thermosetting PAE resin or a thermoplastic PAE resin. For example, the creping adhesive can include the first thermosetting PAE resin, the first thermoplastic resin, and a second thermosetting PAE resin. The second thermosetting PAE resin can have a different reactivity, molecular weight, or both relative to the first thermosetting PAE resin. As such, a bi-modal distribution of the reactive groups (based on the moles of reactive groups per mol of PAE resin) can be present. In another example, the creping adhesive can include the first thermosetting PAE resin, the first thermoplastic PAE resin, and a second thermoplastic PAE resin. In still another example, the creping adhesive can include the first thermosetting PAE resin, the first thermoplastic PAE resin, a second thermosetting PAE resin, and a second thermoplastic PAE resin. In yet another example, the creping adhesive can include the first thermosetting PAE resin, the first thermoplastic PAE resin, the second thermosetting PAE resin, the second thermoplastic PAE resin, and a third thermosetting PAE resin.

The second thermosetting PAE resin can be the reaction product of a third polyamidoamine and a third epihalohydrin. The third polyamidoamine can be a reaction product of a third polyamine and a third dicarboxylic acid. The third epihalohydrin, the third polyamine, and the third dicarboxylic acid (and/or third ester of a dicarboxylic acid) can include those discussed and described above with reference to the first thermosetting PAE resin. The relative amounts of the third epihalohydrin, the third polyamine, and the third dicarboxylic acid (and/or third ester of dicarboxylic acid) can be similar to the amounts discussed and described above with respect to the first thermosetting PAE resin. The particular amounts of the reactants used to make the second thermosetting PAE resin can depend, at least in part, on the desired properties of the second thermosetting PAE resin.

The molar ratio of the third polyamine to the third dicarboxylic acid and/or the third ester of a dicarboxylic acid in the third PAE resin can be from a low of about 0.8:1, about 0.85:1, about 0.9:1, about 0.95:1, or about 1:1 to a high of about 1:1, about 1.05:1, about 1.1:1, about 1.2:1, about 1.3:1, or about 1.4:1. For example, the molar ratio of the third polyamine to the third dicarboxylic acid can be about 0.8:1 to about 1.4:1, about 0.9:1 to about 1.2:1, about 0.9:1 to about 1:1, about 1:0.95 to about 1:1.05, about 1:0.9 to about 1:1.1, about 1:0.85 to about 1:1.1, or about 0.95:1 to about 1.05:1.

The second thermosetting PAE resin can have a secondary amine concentration from a low of about 4 mmols, about 4.3 mmols, about 4.5 mmols, about 4.7 mmols, about 5 mmols, about 5.3 mmols, or about 5.5 mmols to a high of about 6 mmols, about 6.3 mmols, about 6.5 mmols, about 6.7 mmols, about 7 mmols, about 7.5 mmols, or about 8 mmols per gram of the second thermosetting PAE resin. For example, the second thermosetting PAE resin can have a secondary amine concentration of about 4 mmols to about 5.4 mmols, about 4.6 mmols to about 6.2 mmols, about 5.2 mmols to about 6.6 mmols, about 5.8 mmols to about 7.2 mmols, about 6.4 mmols to about 8 mmols, or about 4 mmols to about 8 mmols per gram of the second thermosetting PAE resin.

The weight average molecular weight of the second thermosetting PAE resin can be from a low of about 150,000, about 155,000, about 160,000, about 165,000, about 170,000, or about 180,000 to a high of about 200,000, about 210,000, about 220,000, about 230,000, about 240,000, about 250,000, about 300,000, about 350,000, about 400,000, about 450,000, about 500,000, about 550,000, about 600,000, about 650,000, about 700,000, about 750,000, or about 800,000. For example, the weight average molecular weight of the second thermosetting resin can be about 150,000 to about 250,000, about 155,000 to about 185,000, about 175,000 to about 210,000, about 165,000 to about 225,000, about 195,000 to about 235,000, about 210,000 to about 245,000, about 225,000 to about 425,000, about 325,000 to about 575,000, about 410,000 to about 625,000, about 475,000 to about 740,000, about 525,000 to about 675,000, about 625,000 to about 775,000, or about 675,000 to about 800,000. In another example, the second thermosetting PAE resin can have a weight average molecular weight of at least 150,000, at least 155,000, at least 160,000, at least 165,000, at least 170,000, at least 175,000, at least 180,000, at least 190,000, at least 200,000, at least 210,000, at least 225,000, or at least 240,000 and up to about 250,000, about 300,000, about 400,000, about 500,000, about 600,000, about 700,000, or about 800,000.

The second thermosetting PAE resin can have a molar ratio of the third epihalohydrin to the secondary amine groups in the third polyamidoamine (moles epihalohydrin to moles secondary amine groups) from a low of about 0.5:1, about 0.53:1, about 0.55:1, about 0.57:1, or about 0.6:1 to a high of about 0.65:1, about 0.66:1, about 0.67:1, about 0.68:1, about 0.69:1, or about 0.7:1. For example, the second thermosetting PAE resin can have a molar ratio of the third epihalohydrin to the secondary amine groups in the third polyamidoamine from about 0.5:1 to about 0.7:1, about 0.55:1 to about 0.65:1, about 0.6:1 to about 0.7:1, about 0.58:1 to about 0.64:1, or about 0.58:1 to about 0.67:1. In another example, the second thermosetting PAE resin can have a molar ratio of the third epihalohydrin to the secondary amine groups in the third polyamidoamine of at least 0.5:1, at least 0.53:1, at least 0.55:1, at least 0.57:1, or at least 0.6:1 and up to about 0.62:1, about 0.64:1, about 0.66:1, about 0.68:1, or about 0.7:1.

The reactivity of the second thermosetting PAE resin can be expressed as the ratio of moles of reactive groups per mole of the second thermosetting PAE resin. The ratio of the moles of reactive groups per mole of the second thermosetting PAE resin can be from a low of about 500:1, about 510:1, about 520:1, about 530:1, about 540:1, about 550:1, about 560:1, about 570:1, or about 580:1 to a high of about 610:1, about 620:1, about 640:1, about 650:1, about 665:1, about 675:1, about 685:1, or about 700:1. For example, the ratio of the moles of reactive groups per mole of the second thermosetting PAE resin can be from about 500:1 to about 700:1, about 525:1 to about 615:1, about 545:1 to about 635:1, about 565:1 to about 600:1, about 515:1 to about 585:1, about 575:1 to about 680:1, about 615:1 to about 680:1, or about 590:1 to about 670:1. In another example, molar ratio of the reactive groups to moles of the first thermosetting PAE resin can be at least 500:1, at least 515:1, at least 535:1, at least 555:1, at least 565:1, at least 580:1, at least 590:1, at least 600:1, at least 610:1, at least 615:1, at least 620:1, at least 630:1, at least 640:1, or at least 650:1 and up to about 660:1, about 670:1, about 680:1, about 690:1, or about 700:1. The reactive groups in the first thermosetting PAE resin can be or include an azetidinium group, pendant halo-groups such as chloro-groups, or both.

The second thermosetting PAE resin can have a viscosity from a low of about 5 cP, about 10 cP, about 20 cP, about 40 cP, or about 60 cP to a high of about 100 cP, about 125 cP, about 150 cP, about 175 cP, or about 200 cP at a temperature of about 25° C. For example, the second thermosetting PAE resin can have a viscosity from a low of about 5 cP, about 10 cP, about 20 cP, about 40 cP, or about 60 cP to a high of about 100 cP, about 125 cP, about 150 cP, about 175 cP, or about 200 cP at a temperature of about 25° C. and a solids concentration of about 15 wt %.

The second thermosetting PAE resin can have a pH from a low of about 2.5, about 3, about 3.5, or about 4 to a high of about 4.5, about 5, about 5.5, about 6, about 6.5, about 7, or about 8. Illustrative acids that can be used to adjust the pH of the second thermosetting PAE resin can include, but are not limited to, hydrochloric acid, sulfuric acid, methanesulfonic acid, nitric acid, formic acid, phosphoric acid, acetic acid, or any mixture thereof. The re-wetting properties of the second thermosetting PAE resin can be modified by the amount and the particular type of acid used to stabilized the second thermosetting PAE resin.

The amount of the second thermosetting PAE resin in the creping adhesive can be from a low of about 1 wt %, about 3 wt %, about 5 wt %, about 7 wt %, about 10 wt %, about 15 wt %, about 20 wt %, or about 30 wt % to a high of about 40 wt %, about 50 wt %, about 55 wt %, about 60 wt %, about 65 wt %, about 70 wt %, about 75 wt %, or about 80 wt %, based on the combined weight of the first thermosetting PAE resin, the first thermoplastic PAE resin, the re-wetting agent, and the second thermosetting PAE resin.

The second thermoplastic PAE resin can be the reaction product of a fourth polyamidoamine and a fourth epihalohydrin. The fourth polyamidoamine can be a reaction product of a fourth polyamine and a fourth dicarboxylic acid. The fourth epihalohydrin, the fourth polyamine, and the fourth dicarboxylic acid (and/or fourth ester of a dicarboxylic acid)

can include those discussed and described above with reference to the first thermosetting PAE resin. When the creping adhesive includes the first thermoplastic PAE and the second thermoplastic PAE, the creping adhesive can have a bi-modal distribution of the molecular weight of the thermoplastic component.

The second thermoplastic PAE resin can have a weight average molecular weight from a low of about 200,000, about 250,000, about 300,000, about 350,000, about 400,000, about 450,000, or about 500,000 to a high of about 1,000,000, about 1,250,000, about 1,500,000, about 1,750,000, about 2,000,00, about 2,250,000, about 2,500,000, about 2,750,000, or about 3,000,000. For example, the second thermoplastic PAE resin can have a weight average molecular weight of about 200,000 to about 3,000,000, about 275,000 to about 1,300,000, about 475,000 to about 975,000, about 550,000 to about 1,200,000, about 825,000 to about 1,700,000, about 1,400,000 to about 2,300,000, about 1,800,000 to about 2,600,000, about 1,950,000 to about 2,850,000, or about 2,300,000 to about 3,000,000. In another example, the second thermoplastic PAE resin can have a weight average molecular weight of at least 200,000, at least 250,000, at least 300,000, at least 350,000, at least 400,000, at least 450,000, or at least 500,000 and up to about 1,000,000, about 1,250,000, about 1,500,000, about 1,750,000, about 2,000,000, about 2,250,000, about 2,500,000, about 2,750,000, or about 3,000,000.

The molar ratio of the fourth polyamine to the fourth dicarboxylic acid and/or the fourth ester of a dicarboxylic acid in the fourth PAE resin can be from a low of about 0.8:1, about 0.85:1, about 0.9:1, about 0.95:1, or about 1:1 to a high of about 1:1, about 1.05:1, about 1.1:1, about 1.2:1, about 1.3:1, or about 1.4:1. For example, the molar ratio of the fourth polyamine to the third dicarboxylic acid can be about 0.8:1 to about 1.4:1, about 0.9:1 to about 1.2:1, about 0.9:1 to about 1:1, about 1:0.95 to about 1:1.05, about 1:0.9 to about 1:1.1, about 1:0.85 to about 1:1.1, or about 0.95:1 to about 1.05:1.

The second thermoplastic PAE resin can have a secondary amine concentration from a low of about 4 mmols, about 4.3 mmols, about 4.5 mmols, about 4.7 mmols, about 5 mmols, about 5.3 mmols, or about 5.5 mmols to a high of about 6 mmols, about 6.3 mmols, about 6.5 mmols, about 6.7 mmols, about 7 mmols, about 7.5 mmols, or about 8 mmols per gram of the second thermoplastic PAE resin. For example, the second thermoplastic PAE resin can have a secondary amine concentration of about 4 mmols to about 5.4 mmols, about 4.6 mmols to about 6.2 mmols, about 5.2 mmols to about 6.6 mmols, about 5.8 mmols to about 7.2 mmols, about 6.4 mmols to about 8 mmols, or about 4 mmols to about 8 mmols per gram of the second thermoplastic PAE resin.

The amount of the second thermoplastic PAE resin in the creping adhesive can be from a low of about 1 wt %, about 3 wt %, about 5 wt %, about 7 wt %, about 10 wt %, about 15 wt %, about 20 wt %, or about 30 wt % to a high of about 60 wt %, about 65 wt %, about 70 wt %, about 75 wt %, about 80 wt %, about 85 wt %, or about 90 wt %, based on the combined weight of the first thermosetting PAE resin, the first thermoplastic PAE resin, the re-wetting agent, and the second thermoplastic resin.

The third thermosetting PAE resin can be the reaction product of a fifth polyamidoamine and a fifth epihalohydrin. The fifth polyamidoamine can be a reaction product of a fifth polyamine and a fifth dicarboxylic acid. The fifth epihalohydrin, the fifth polyamine, and the fifth dicarboxylic acid (and/or fifth ester of a dicarboxylic acid) can include those discussed and described above with reference to the first thermosetting PAE resin. The relative amounts of the fifth epihalohydrin, the fifth polyamine, and the fifth dicarboxylic acid (and/or fifth ester of dicarboxylic acid) can be similar to the amounts discussed and described above with respect to the first thermosetting PAE resin. The particular amounts of the reactants used to make the third thermosetting PAE resin can depend, at least in part, on the desired properties of the third thermosetting PAE resin.

The molar ratio of the fifth polyamine to the fifth dicarboxylic acid and/or the fifth ester of a dicarboxylic acid in the third thermosetting PAE resin can be from a low of about 0.8:1, about 0.85:1, about 0.9:1, about 0.95:1, or about 1:1 to a high of about 1.1:1, about 1.15:1, about 1.2:1, about 1.25:1, about 1.3:1, or about 1.4:1. For example, the molar ratio of the fifth polyamine to the fifth dicarboxylic acid can be about 0.83:1 to about 0.97:1, about 0.88:1 to about 1.06:1, about 0.92:1 to about 1.15:1, about 0.95:1.3 to about 1.2:1.35, about 1.17:1 to about 1.28:1, or about 0.9 to about 1.1.

The weight average molecular weight of the third thermosetting PAE resin can be from a low of about 600,000, about 650,000, about 700,000, about 750,000, about 800,000, about 900,000, about 950,000, about 1,000,000, about 1,050,000, or about 1,100,000 to a high of about 1,200,000, about 1,250,000, about 1,300,000, about 1,400,000, about 1,500,000, about 1,600,000, about 1,700,000, or about 1,800,000. For example, the weight average molecular weight of the third thermosetting PAE resin can be about 675,000 to about 975,000, about 750,000 to about 950,000, about 800,000 to about 900,000, about 825,000 to about 875,000, about 825,000 to about 860,000, about 840,000 to about 875,000, about 900,000 to about 1,350,000, about 1,150,000 to about 1,650,000, about 1,250,000 to about 1,550,000, about 1,350,000 to about 1,750,000, or about 1,650,000 to about 1,800,000. In another example, the third thermosetting PAE resin can have a weight average molecular weight of at least 700,000, at least 750,000, at least 800,000, at least 850,000, at least 900,000, at least 950,000, at least 1,000,000, at least 1,050,000, at least 1,100,000, or at least 1,200,000 and up to about 1,400,000, about 1,500,000, about 1,600,000, about 1,700,000, or about 1,800,000.

The third thermosetting PAE resin can have a molar ratio of the fifth epihalohydrin to the secondary amine groups in the fifth polyamidoamine (moles epihalohydrin to moles secondary amine groups) from a low of about 0.2:1, about 0.25:1, about 0.3:1, about 0.35:1, or about 0.4:1 to a high of about 0.5:1, about 0.6:1, about 0.65:1, about 0.7:1, about 0.75:1, or about 0.8:1. For example, the third thermosetting PAE resin can have a molar ratio of the fifth epihalohydrin to the secondary amine groups in the fifth polyamidoamine from about 0.2:1 to about 0.55:1, about 0.3:1 to about 0.45:1, about 0.35:1 to about 0.68:1, about 0.4:1 to about 0.75:1, or about 0.45:1 to about 0.7:1. In another example, the third thermosetting PAE resin can have a molar ratio of the fifth epihalohydrin to the secondary amine groups in the fifth polyamidoamine of at least 0.3:1, at least 0.35:1, at least 0.4:1, at least 0.45:1, or at least 0.5:1 and up to about 0.6:1, about 0.65:1, about 0.7:1, about 0.75:1, or about 0.8:1.

The third thermosetting PAE resin can be free from any secondary amines. The third thermosetting PAE resin can have a secondary amine concentration from a low of about 0.01 mmols, about 0.05 mmols, about 0.07 mmols, about 0.1 mmols, about 0.13 mmols, about 0.15 mmols, or about 0.15 mmols to a high of about 0.17 mmols, about 0.2 mmols, about 0.23 mmols, about 0.25 mmols, about 0.27 mmols, or about 0.3 mmols per gram of the third thermosetting PAE resin. For example, the third thermosetting PAE resin can have a secondary amine concentration of about 0.05 mmols to about 0.14 mmols, about 0.05 mmols to about 0.2 mmols, about 0.08 mmols to about 0.22 mmols, about 0.1 mmols to about 0.22 mmols, about 0.14 mmols to about 0.26 mmols, about 0.18 mmols to about 0.28 mmols, about 0.2 mmols to about 0.3 mmols, about 0.14 mmols to about 0.28 mmols, or about 0.05 mmols to about 0.3 mmols per gram of the third thermosetting PAE resin.

The reactivity of the third thermosetting PAE resin can be expressed as the ratio of moles of reactive groups per mole of the third thermosetting PAE resin. The ratio of the moles of reactive groups per mole of the third thermosetting PAE resin can be from a low of about 0.02:1, about 0.04:1, about 0.06:1, about 0.08:1, about 0.1:1, about 0.13:1, about 0.17:1, about 0.2:1, or about 0.24:1 to a high of about 0.3:1, about 0.34:1, about 0.38:1, about 0.44:1, about 0.48:1, about 0.52:1, about 0.56:1, or about 0.6:1. For example, the ratio of the moles of reactive groups per mole of the third thermosetting PAE resin can be from about 0.025:1 to about 0.1:1, about 0.07:1 to about 0.15:1, about 0.1:1 to about 0.3:1, about 0.1:1 to about 0.5:1, about 0.15:1 to about 0.4:1, about 0.2:1 to about 0.45:1, about 0.3:1 to about 0.46:1, or about 0.5:1 to about 0.6:1. In another example, molar ratio of the reactive groups to moles of the first thermosetting PAE resin can be at least 0.02:1, at least 0.1:1, at least 0.15:1, at least 0.2:1, at least 0.25:1, at least 0.3:1, at least 0.35:1, or at least 0.4:1 and up to about 0.45:1, about 0.5:1, about 0.55:1, or about 0.6:1. The reactive groups in the first thermosetting PAE resin can be or include an azetidinium group, pendant halo-groups such as chloro-groups, or both.

The third thermosetting PAE resin can have a viscosity from a low of about 30 cP, about 40 cP, about 50 cP, about 60 cP, or about 70 cP to a high of about 100 cP, about 110 cP, about 120 cP, about 130 cP, or about 140 cP at a temperature of about 25° C. For example, the third thermosetting PAE resin can have a viscosity from a low of about 30 cP, about 40 cP, about 50 cP, about 60 cP, or about 70 cP to a high of about 100 cP, about 110 cP, about 120 cP, about 130 cP, or about 140 cP at a temperature of about 25° C. and a solids concentration of about 15 wt %.

The third thermosetting PAE resin can have a pH from a low of about 2.5, about 3, about 3.5, or about 4 to a high of about 4.5, about 5, about 5.5, about 6, about 6.5, about 7, or about 8. Illustrative acids that can be used to adjust the pH of the third thermosetting PAE resin can include, but are not limited to, hydrochloric acid, sulfuric acid, methanesulfonic acid, nitric acid, formic acid, phosphoric acid, acetic acid, or any mixture thereof. The re-wetting properties of the third thermosetting PAE resin can be modified by the amount and the particular type of acid used to stabilized the third thermosetting PAE resin.

The amount of the third thermosetting PAE resin in the creping adhesive can be from a low of about 2 wt %, about 5 wt %, about 10 wt %, about 12 wt %, about or about 15 wt % to a high of about 30 wt %, about 35 wt %, about 37 wt %, about 40 wt %, about 43 wt %, or about 45 wt %, based on the combined weight of the first thermosetting PAE resin, the first thermoplastic PAE resin, the re-wetting agent, and the third thermosetting PAE resin. The amount of the third thermosetting PAE resin in the creping adhesive can be from a low of about 2 wt %, about 5 wt %, about 10 wt %, about 12 wt %, about or about 15 wt % to a high of about 30 wt %, about 35 wt %, about 37 wt %, about 40 wt %, about 43 wt %, or about 45 wt %, based on the combined weight of the first thermosetting PAE resin, the first thermoplastic PAE resin, the re-wetting agent, and the third thermosetting PAE resin.

When the creping adhesive includes the first and second thermosetting PAE resins and the first and second thermoplastic PAE resins, the amount of the first thermosetting PAE resin can be about 5 wt % to about 80 wt %, the amount of the first thermoplastic PAE resin can be about 15 wt % to about 90 wt %, the amount of the second thermosetting PAE resin can be about 1 wt % to about 80 wt %, and the amount of the second thermoplastic PAE resin can be about 1 wt % to about 90 wt %, based on the combined weight of the first and second thermosetting PAE resins, the first and second thermoplastic PAE resins, and the one or more re-wetting agents. For example, when the creping adhesive includes the first and second thermosetting PAE resins and the first and second thermoplastic PAE resins, the amount of the first thermosetting PAE resin can be about 3 wt %, about 5 wt %, about 10 wt %, about 15 wt %, or about 20 wt % to about 50 wt %, about 60 wt %, about 70 wt %, or about 80 wt %, the amount of the first thermoplastic PAE resin can be about 10 wt %, about 20 wt %, about 30 wt %, or about 40 wt % to about 60 wt %, about 70 wt %, about 80 wt %, or about 90 wt %, the amount of the second thermosetting PAE resin can be about 10 wt %, about 20 wt %, or about 30 wt % to about 50 wt %, about 60 wt %, or about 70 wt % and the amount of the second thermoplastic PAE resin can be about 10 wt %, about 20 wt %, or about 30 wt % to about 50 wt %, about 60 wt %, or about 70 wt %, based on the combined weight of the first and second thermosetting PAE resins, the first and second thermoplastic PAE resins, and the one or more rewetting agents.

When the creping adhesive includes the first, second, and third thermosetting PAE resins and the first and second thermoplastic PAE resins, the amount of the first thermosetting PAE resin can be about 5 wt % to about 70 wt %, the amount of the first thermoplastic PAE resin can be about 15 wt % to about 80 wt %, the amount of the second thermosetting PAE resin can be about 25 wt % to about 60 wt %, the amount of the second thermoplastic PAE resin can be about 20 wt % to about 65 wt %, and the amount of the third thermosetting PAE resin can be about 2 wt % to about 45 wt %, based on the combined weight of the first, second, and third thermosetting PAE resins, the first and second thermoplastic PAE resins, and the one or more re-wetting agents. For example, when the creping adhesive includes the first, second, and third thermosetting PAE resins and the first and second thermoplastic PAE resins, the amount of the first thermosetting PAE resin can be about 5 wt %, about 10 wt %, about 15 wt %, or about 20 wt % to about 50 wt %, about 60 wt %, about 65 wt %, or about 70 wt %, the amount of the first thermoplastic PAE resin can be about 15 wt %, about 20 wt %, about 30 wt %, or about 40 wt % to about 60 wt %, about 70 wt %, about 75 wt %, or about 80 wt %, the amount of the second thermosetting PAE resin can be about 25 wt %, about 30 wt %, or about 35 wt % to about 50 wt %, about 55 wt %, or about 60 wt %, the amount of the second thermoplastic PAE resin can be about 20 wt %, about 25 wt %, or about 30 wt % to about 50 wt %, about 60 wt %, or about 65 wt %, and the amount of the third thermoplastic PAE resin can be about 2 wt %, about 3 wt %, about 5 wt %, or about 10 wt % to about 25 wt %, about 35 wt %, or about 45 wt %, based on the combined weight of the first, second, and third thermosetting PAE resins, the first and second thermoplastic PAE resins, and the one or more re-wetting agents.

Suitable methods for making polyamidoamine-epihalohydrin resins can include those discussed and described in, for example, U.S. Pat. Nos. 2,926,116; 3,058,873; 3,772,076; 5,338,807; EP Patent No.: EP 0488767; Canadian Patent Application Publication No.: CA 979,579; and GB Patent Application Publication No.: GB 865,727(A).

In one or more embodiments, the various components of the creping adhesive can be dissolved, dispersed, suspended, emulsified, or otherwise added or mixed with water. For example, the amount of water in the creping adhesive can be from a low of about 0.1 wt %, about 1 wt %, about 5 wt %, about 10 wt %, or about 20 wt % to a high of about 50 wt %, about 60 wt %, or about 70 wt %, based on the combined weight of the thermosetting PAE resin, the thermoplastic PAE resin, the re-wetting agent, and water. In another example, the creping adhesive can include about 0.1 wt % to about 5 wt %, about 5 wt % to about 15 wt %, about 8 wt % to about 25 wt %, about 15 wt % to about 25 wt %, about 15 wt % to about 30 wt %, about 10 wt % to about 25 wt %, about 20 wt % to about 35 wt %, about 20 wt % to about 25 wt %, about 35 wt % to about 55 wt %, about 50 wt % to about 70 wt %, about 55 wt % to about 65 wt %, about 60 wt % to about 65 wt %, about 65 wt % to about 80 wt %, about 70 wt % to about 85 wt %, about 75 wt % to about 90 wt %, about 80 wt % to about 90 wt %, about 85 wt % to about 90 wt %, or about 80 wt % to about 95 wt % of water, based on the combined weight of all thermosetting PAE resins, all thermoplastic PAE resins, the one or more re-wetting agents, and water.

In one or more embodiments, the creping adhesive can optionally include one or more additional polymers. The additional polymer can be natural, synthetic, or derived from a natural source. Illustrative additional polymers that can be included in the creping adhesive can include, but are not limited to, polyvinyl alcohol, hemicellulose, polyvinyl amine, polyacrylamide, or any mixture thereof. If the creping adhesive includes the additional polymer(s), the amount of the additional polymer present in the creping adhesive can be from a low of about 1 wt % to a high of about 90 wt %, based on the combined weight of the first thermosetting PAE resin, the first thermoplastic PAE resin, the re-wetting agent, and the additional polymer(s).

In one or more embodiments, the creping adhesive can further include one or more release aids. Suitable release aids can be based on a quaternary imidazoline (e.g., methyl and ethyl sulfate salts of quaternary imidazoline derived from fatty acids), one or more mineral oils, one or more vegetable oils, one or more silicon oils, one or more surfactants, one or more soaps, one or more polyols, glycols, glycerol, sorbitol, polyglycerine, polyethylene glycol, sugars, oligosaccharides, hydrocarbon oils, or any mixture thereof. The quaternary imidazoline release aid can be supplied as a mixture containing about 90 wt % imidazoline and about 10 wt % diethylene glycol, which can be dissolved in a high boiling point solvent. For example, about 20 wt % to about 80 wt % of the quaternary imidazoline can be dissolved in about 80 wt % to about 20 wt % of a solvent. The release aid can also include one or more mineral oils, vegetable oils, or a mixture thereof. In one or more embodiments, the release aid can be an oil-based dispersion of paraffinic oil, naphthenic oil, a vegetable oil, or any mixture thereof. The imidazoline-based release aid itself can have an adjustable viscosity that can be varied by using a mixture of high boiling compounds as a solvent for the quaternized imidazoline. Other suitable release aids can include those discussed and described in U.S. Pat. Nos. 5,660,687 and 5,833,806.

The creping adhesive can also include one or more additional additives. Illustrative additional additives can include, but are not limited to, tackifiers, surfactants, dispersants, salts which are effective to adjust water hardness, acids or bases for adjusting pH of the creping adhesive.

In one or more embodiments, the creping adhesive can be applied to a drying surface. A cellulosic fiber web can be placed, contacted, disposed, or otherwise located onto the drying surface. The cellulosic fiber web can be adhered to the drying surface via the creping adhesive. The cellulosic fiber web can be at least partially dried. The at least partially dried cellulosic fiber web can be dislodged or otherwise removed from the drying surface to provide a creped paper product. In one or more embodiments, the drying surface can be the surface of a Yankee dryer.

In one or more embodiments, the creping adhesive can be formed on the drying surface. For example, a creping adhesive that includes the first thermosetting PAE resin, the first thermoplastic PAE resin, and the re-wetting agent can be applied to the drying surface as a mixture. In another example, the creping adhesive that includes the first thermosetting PAE resin, the first thermoplastic PAE resin, and the re-wetting agent can be applied separately to the drying surface such that the creping adhesive can be formed on the surface. If any two or more components of the creping adhesive are separately applied to the drying surface, the two or more components can be applied in any order or sequence with respect to one another or at the same time with respect to one another. For example, a mixture of the first thermosetting PAE resin and the re-wetting agent can be applied to the surface and the first thermoplastic PAE resin can be applied to the surface, before, after, or simultaneously with respect to the mixture of the first thermosetting PAE resin and the re-wetting agent, to form the creping adhesive on the drying surface as opposed for forming the creping adhesive prior to application to the surface. In another example a creping adhesive that includes the first, second, and third PAE resins, the first and second thermoplastic PAE resins, and the re-wetting agent, the creping adhesive can be applied as a mixture, as individual components, or as multiple mixtures, where each of the multiple mixtures is free from at least one of the components. For example, a mixture of the first and second thermosetting PAE resin, the first and second thermoplastic PAE resins, and the re-wetting agent can be applied to the drying surface as a mixture and the third PAE resin can be applied separately from the mixture to the drying surface to form the creping adhesive on the surface that can include the first, second, and third thermosetting PAE resins, the first and second thermoplastic PAE resins, and the re-wetting agent.

A Yankee dryer is a large diameter cylinder. For example, the Yankee dryer can be a cylinder having an internal diameter from about 8 feet to about 20 feet. The drum can be heated with high pressure steam or other heated medium to provide a hot or heated surface. For example, the surface of the dryer can be heated to a temperature from a low of about 20° C., about 30° C., or about 40° C. to a high of about 60° C., about 80° C., about 100° C., about 120° C., about 140° C., about 160° C., about 180° C., about 200° C., or about 220° C. In another example, the surface of the dryer can be heated to a temperature of at least 60° C., at least 80° C., at least 100° C., at least 130° C., at least 150° C., at least 155° C., at least 160° C., at least 165° C., at least 170° C., at least 175° C., at least 180° C., at least 185° C., or at least 190° C. In another example, the surface of the dryer can be heated to a temperature from a low of about 20° C., about 30° C., or about 40° C. to a high of about 60° C., about 80° C., about 100° C., about 130° C., about 150° C., about 170° C., or about 195° C. The heated surface can act to dry the cellulosic fiber web to produce the creped paper product.

The cellulosic fiber web can be heated on the drying surface for a time of about 10 seconds to about 5 minutes. The cellulosic fiber web can be heated to a temperature of about 20° C., about 30° C., or about 40° C. to about 60° C., about 80° C., about 100° C., about 120° C., about 140° C., about 160° C., or about 180° C. when adhered to the surface of the dryer.

Prior to encountering the Yankee dryer, the paper web, formed by dewatering the cellulosic fiber slurry, can be transferred to a felt or fabric substrate in a so-called press section where de-watering can be continued to increase the consistency of the paper, usually to about 40% to about 80%, either by mechanically compacting the paper or by some other de-watering method such as through-air-drying with hot air before feeding the Yankee dryer. Thereafter, the paper web can be transferred in this partially dry, high solids condition to the surface of the Yankee dryer.

The adhesion properties of the creping adhesive can be modified during production of the creped paper product by varying the amount of crosslinking that can occur when the first thermosetting PAE resin, the second thermosetting PAE resin, and/or the third thermosetting PAE resin dry. By varying the amount of crosslinking that can occur in the first thermosetting PAE resin, the second thermosetting PAE resin, and/or the third thermosetting PAE resin, the level of adhesion of the fibrous substrate onto the dryer surface can be adjusted or otherwise controlled. The amount of crosslinking can be varied by altering the preparation of a given thermosetting PAE resin, i.e., the extent by which the thermosetting PAE resin is crosslinked during its preparation, and/or by altering the type and/or amount of the given thermosetting PAE resin included in the creping composition.

The first thermoplastic PAE resin and/or the second thermoplastic PAE resin can react with the first thermosetting PAE resin, the second thermosetting PAE resin, and/or the third thermosetting PAE resin to attenuate or otherwise control the reactivity of the resin. The reactive (nucleophilic) modifiers can react with a halohydrin, e.g., a chlorohydrin group, of a given thermosetting PAE resin to effectively reduce the amount of available halohydrin groups and thus reduce the degree of crosslinking that is available in the given thermosetting PAE resin and provide greater control of the crosslinking reaction on the surface of the dryer.

The thermosetting or crosslinking process can be allowed to develop on the surface of the dryer under controlled conditions. The controllability of the creping adhesive can create the ability to obtain good tissue and towel creping properties under a wide range of operating conditions. The creping adhesive can provide good creping performance under the highly demanding conditions of the Through-Air-Drying (TAD) process, which generally employs high drum temperatures and low moisture content. In addition, the coating can be controlled to provide good creping performance under high moisture conditions of conventional creping processes.

As used herein, the terms "cellulosic fiber web," "fibrous web," "tissue paper web," "paper web," "web," and "cellulosic fiber product" all refer to sheets of paper made by a process that includes forming an aqueous papermaking furnish, depositing the furnish onto a foraminous surface to form a wet cellulosic web, removing at least a portion of the water from the web to provide a partially dried web, e.g., by gravity or vacuum-assisted drainage, with or without pressing, and by evaporation, adhering the partially dried web to a heated drying surface, e.g., a drying surface of a Yankee Dryer, removing at least a portion of the water by evaporation to provide a dried web, removing the dried web by a creping blade such as a doctor blade to provide a creped product. The creped product can be wound onto a reel. The moisture content of the at least partially dried web delivered to the creping equipment can be between about 5 wt % and about 85 wt %. The web can be comprised of various types of natural and recycled fibers including wood pulps of chemical and mechanical types. The web can be composed of up to 100% recycled fibers. The fibers can comprise hardwood, softwood and cotton fibers. The tissue web can also contain particulate fillers, fines, as well as process chemicals used in the paper-making process such as strength additives, softeners, surfactants and organic resins.

The creping adhesive can be applied to the surface of the dryer at a rate, relative to the rate of dryer surface rotation, which can provide an adequate amount of adhesion or tack to hold the web to the surface of the dryer during drying yet release the dried web upon completion of drying. Conventional creping adhesive coverage rates and weights can be used as are known to those skilled in the art. For example, the creping adhesive can be applied to the surface of the dryer in an amount from a low of about 0.01 mg/m$^2$, about 0.1 mg/m$^2$, about 1 mg/m$^2$, about 5 mg/m$^2$, about 10 mg/m$^2$, about 25 mg/m$^2$, or about 50 mg/m$^2$, to a high of about 100 mg/m$^2$, about 200 mg/m$^2$, about 300 mg/m$^2$, about 400 mg/m$^2$, or about 500 mg/m$^2$, based on the solids weight of the creping adhesive. Low application rates of about 0.01 mg/m$^2$ to about 10 mg/m$^2$, based on the solids weight of the creping adhesive, are surprisingly effective. Indeed, the creping adhesive of the present invention can exhibit good adhesion and creping performance at very low application rates such as about 0.01 mg/m$^2$ to about 2 mg/m$^2$.

The creping adhesive applied to the surface of the dryer can form a layer, film, or coating on the surface of the dryer having a thickness of at least 0.01 μm, at least 0.1 μm, at least 1 μm, at least 10 μm, at least 50 μm, at least 100 μm, at least 500 μm, at least 1 mm, at least 2 mm, at least 3 mm, at least 4 mm, at least 5 mm, at least 6 mm, at least 7 mm, at least 8 mm, at least 9 mm, or at least 10 mm. For example, creping adhesive applied to the surface of the dryer can form a layer, film, or coating on the surface of the dryer having a thickness of about 1 μm to about 100 μm, about 50 μm to about 300 μm, about 200 μm to about 800 μm about 400 μm to about 1 mm, about 700 μm to about 2 mm, about 1 mm to about 2.5 mm, about 1.5 mm to about 4 mm, about 3 mm to about 7 mm, about 4.5 mm to about 9.5 mm, about 5.5 mm to about 11 mm, about 6.5 mm to about 12 mm, about 7.5 mm to about 9 mm, or about 8 mm to about 10.5 mm.

The creped product can have a basis weight between about 10 g/m$^2$ and about 50 g/m$^2$ and, more usually, between about 10 g/m$^2$ and about 30 g/m$^2$. The density of the creped product can be about 0.03 g/m$^3$ and about 0.6 g/cm$^3$ such as about 0.05 g/cm$^3$ and 0.2 g/cm$^3$.

The creping adhesive can be applied onto the drying surface, e.g., a surface of a Yankee dryer, to provide a coating that can develop a crepe ratio of least −2, at least −1, at least 1, at least 2, at least 3, at least 4, at least 5, at least 6, or at least 7. For example, creping adhesive can be applied onto the drying surface, e.g., a surface of a Yankee dryer, to provide a coating that can develop a crepe ratio of about −2 to about 2, about −2 to about 7, about −1 to about 1, about 0 to about 1, about 0.5 to about 3, about 1.5 to about 4, about 2 to about 5, about 2.5 to about 5, about 3 to about 6, about 3.5 to about 5, about 4 to about 7, about 4.5 to about 6, about 5 to about 7, about 5.5 to about 6.5, about 6 to about 7, or about 3 to about 7.

Suitable methods for applying the creping adhesive and creping cellulosic webs can include those discussed and described in U.S. Pat. Nos. 3,640,841; 4,304,625; 4,440,898; 4,788,243; 4,994,146; 5,025,046; 5,187,219; 5,326,434; 5,246,544; 5,370,773; 5,487,813; 5,490,903; 5,633,309; 5,660,687; 5,846,380; 4,300,981; 4,063,995; 4,501,640; 4,528,316; 4,886,579; 5,179,150; 5,234,547; 5,374,334; 5,382,323; 5,468,796; 5,902,862; 5,942,085; 5,944,954; 3,879,257; 4,684,439; 3,926,716; 4,883,564; and 5,437,766.

EXAMPLES

In order to provide a better understanding of the foregoing discussion, the following non-limiting examples are offered. Although the examples can be directed to specific embodiments, they are not to be viewed as limiting the invention in any specific respect.

Example 1

Preparation of Polyamidoamine Prepolymer I

A glass reactor with a 5-neck top and equipped with a stainless steel stirring shaft, a reflux condenser, temperature probe, and a hot oil bath was used to produce the polyamidoamine prepolymer I. To the reactor was added about 500.5 grams of diethylenetriamine (DETA). The stirrer was turned on and about 730 grams of adipic acid was added slowly to the reactor over a time period of about 45 minutes with stirring. The reaction temperature increased from about 25° C. to about 145° C. during addition of the adipic acid. After the adipic acid addition was complete, the reactor was immersed in a hot oil bath and heated to a temperature of about 160° C. At a temperature of about 150° C. the reaction mixture began to reflux. The reflux condenser was reconfigured for distillation and distillate was collected in a separate receiver. The reaction mixture was sampled at about 30 minute intervals. Each sample was diluted with water to a solids concentration of about 45 wt % and the viscosity was measured with Brookfield viscometer at a temperature of about 25° C. When the sample reached a viscosity of about 290 cP the distillation condenser was reconfigured to reflux. Water was added slowly to the reaction mixture through the reflux condenser to dilute and cool the reaction. Water was added to provide a final solids concentration of 45 wt %. The viscosity of the polyamidoamine prepolymer I was about 290 cP at a temperature of about 25° C., as measured by a Brookfield small sample adapter at a temperature of about 25° C. The weight average molecular weight of the polyamidoamine prepolymer I was about 35,000 Daltons, as measured by to gel permeation chromatography.

Example 2

Preparation of Polyamidoamine Prepolymer II

A glass reactor with a 5-neck top and equipped with a stainless steel stirring shaft, a reflux condenser, temperature probe, and a hot oil bath was used to produce the polyamidoamine prepolymer II. To the reactor was added about 1,574.5 grams of glutaric acid dimethyl ester (DBE-5). The stirrer was turned on and about 1,038.9 grams of DETA was added to the reactor with stirring. The reactor was immersed in a hot oil bath heated to a temperature of about 100° C. At a temperature of about 90° C. the reaction mixture began to reflux. The reflux condenser was reconfigured for distillation and distillate was collected in a separate receiver. The reaction mixture was sampled at about 30 minute intervals. Each sample was diluted with water to a solids concentration of about 45 wt % and the viscosity was measured with Brookfield viscometer at a temperature of about 25° C. When the sample reached a viscosity of about 220 cP the distillation condenser was reconfigured to reflux. Water was added slowly to the reaction mixture through the reflux condenser to dilute and cool the reaction. Water was added to provide a final solids concentration of about 45 wt %. The viscosity of the polyamidoamine prepolymer II was about 220 cP at a temperature of about 25° C., as measured by a Brookfield small sample adapter at a temperature of about 25° C. The weight average molecular weight of the polyamidoamine prepolymer II was about 25,000 Daltons, as measured by gel permeation chromatography.

Example 3

Preparation of Polyamidoamine Prepolymer III

A glass reactor with a 5-neck top and equipped with a stainless steel stirring shaft, a reflux condenser, temperature probe, and a hot oil bath was used to produce the polyamidoamine prepolymer III. To the reactor was added about 1,563.9 grams of glutaric acid dimethyl ester (DBE-5). The stirrer was turned on and about 1,031.9 grams of DETA was added to the reactor with stirring. The reactor was immersed in a hot oil bath heated to a temperature of about 100° C. At a temperature of about 90° C. the reaction mixture began to reflux. The reflux condenser was reconfigured for distillation and distillate was collected in a separate receiver. The reaction mixture was sampled at about 30 minute intervals. Each sample was diluted with water to a solids concentration of about 45 wt % and the viscosity was measured with Brookfield viscometer at a temperature of about 25° C. When the sample reached a viscosity of about 290 cP the distillation condenser was reconfigured to reflux. Water was added slowly to the reaction mixture through the reflux condenser to dilute and cool the reaction. Water was added to obtain final solids of 45%. The viscosity of the polyamidoamine prepolymer III was about 290 cP at a temperature of about 25° C., as measured by a Brookfield small sample adapter at a temperature of about 25° C. The weight average molecular weight of the polyamidoamine prepolymer III was about 35,000 Daltons, as measured by gel permeation chromatography.

Example 4

Preparation of a First Thermosetting PAE Resin from Prepolymer I

A glass reactor with a 5-neck top and equipped with a glass stirring shaft, an equal-pressure addition funnel, a temperature probe, a pH probe, a heating mantle, coiled stainless-steel tubing for circulation of cooling water, and a vacuum-actuated sample tube to allow for the removal and return of sample aliquots from the reactor was used to produce a first thermosetting PAE resin from prepolymer I. To the reactor about 680.3 grams of water followed by about 295.2 grams of the prepolymer I were added. The mixture was heated to a temperature of about 40° C. and about 3.93 grams of epichlorohydrin was added to produce a reaction mixture. The reaction mixture was heated over a time period of about 15 minutes to a temperature of about 75° C. The reaction viscosity was sampled at about 10 minute intervals until a Gardner-Holdt bubble tube viscosity of about A1A was obtained. The viscosity was 15 cP, as measured by a Brookfield small sample adapter at a temperature of about 25° C. About 1.07 grams of epichlorohydrin was added to the reaction mixture heated to a temperature of about 75° C. and a Gardner-Holdt bubble tube viscosity of about AAB was obtained. The viscosity was about 20 cP, as measured by a Brookfield small sample adapter at a temperature of about 25° C. About 0.5 grams of epichlorohydrin was then added and a Gardner-Holdt bubble tube viscosity of about ABB was obtained. The viscosity was about 25 cP, as measured by a Brookfield small sample adapter at a temperature of about 25° C. At this point epichlorohydrin was added drop wise to the reaction mixture heated to a temperature of about 75° C. until a Gardner-Holdt bubble tube viscosity of about E. The reaction mixture was then cooled to a temperature of about 35° C. rapidly in an ice water bath. About 13.4 grams of 93% sulfuric acid was added, followed by about 3.64 grams of water. Additional sulfuric acid was added to adjust the final pH to about 7.1 to produce the first thermosetting PAE resin. The first thermosetting PAE resin had a solids content of about 15 wt %, Gardner-Holdt bubble tube viscosity of about EEF, and a viscosity of about 90 cP, as measured by a Brookfield small sample adapter at a temperature of about 25° C. The first thermosetting PAE resin had a number average molecular weight of about 53,800, a weight average molecular weight of about 1,103,000, and z-average molecular weight of about 14,465,000, as measured according to gel permeation chromatography.

Example 5

Preparation of a First Thermoplastic Resin from Prepolymer I

A glass reactor with a 5-neck top and equipped with a glass stirring shaft, an equal-pressure addition funnel, a temperature probe, a pH probe, a heating mantle, coiled stainless-steel tubing for circulation of cooling water, and a vacuum-actuated sample tube to allow for the removal and return of sample aliquots from the reactor was used to produce a first thermoplastic PAE resin from prepolymer I. To the reactor about 265.7 grams of water, followed by about 661.2 grams of prepolymer I were added. A small amount of water was added to adjust the prepolymer concentration to about 30.5%. The mixture was heated to a temperature of about 40° C. and about 3.35 grams of epichlorohydrin was added to produce a reaction mixture. The reaction mixture was heated over a time period of about 20 minutes to a temperature of about 90° C. The reaction viscosity was sampled at about 10 minute intervals until a Gardner-Holdt bubble tube viscosity of about F was obtained. About 0.61 grams of epichlorohydrin was added to the reaction mixture heated to a temperature of about 90° C. until a Gardner-Holdt bubble tube viscosity of about G was obtained. Epichlorohydrin was then added drop wise until a Gardner-Holdt bubble tube viscosity of about GH was obtained, and the viscosity did not advance further. The reaction mixture was then cooled to a temperature of about 30° C. rapidly in an ice water bath. At a temperature of about 30° C., about 63 grams of 85% phosphoric acid was added, followed by about 5 grams of water. Additional phosphoric acid was added to adjust the final pH to about 7 to produce the first thermoplastic PAE resin. The first thermoplastic PAE resin had a solids content of about 35 wt %, a Gardner-Holdt bubble tube viscosity of about HI, and a viscosity of about 150 cP, as measured by a Brookfield small sample adapter at a temperature of about 25° C. The first thermoplastic PAE resin had a number average molecular weight of about 38,500, a weight average molecular weight of about 90,490, and a z-average molecular weight of about 261,000, as measured according to gel permeation chromatography.

Example 6

Preparation of a Second Thermoplastic PAE Resin from Prepolymer II

A glass reactor with a 5-neck top and equipped with a glass stirring shaft, an equal-pressure addition funnel, a temperature probe, a pH probe, a heating mantle, coiled stainless-steel tubing for circulation of cooling water, and a vacuum-actuated sample tube to allow for the removal and return of sample aliquots from the reactor was used to produce a second thermoplastic PAE resin from prepolymer II. To the reactor about 385.6 grams of water was added, followed by about 247.8 grams of prepolymer II. A small amount of water was added to adjust the prepolymer concentration to about 19.6%. The mixture was heated to a temperature of about 30° C. and about 5.57 grams of epichlorohydrin was added to produce a reaction mixture. The reaction mixture was first stirred for a time period of about 30 minutes at a temperature of about 30° C. and then heated over a time period of about 15 minutes to a temperature of about 80° C. The reaction viscosity was sampled at about 10 minute intervals until a Gardner-Holdt bubble tube viscosity of about BC was obtained. Epichlorohydrin was added drop wise to the reaction mixture heated to a temperature of about 80° C. until a Gardner-Holdt bubble tube viscosity of about F was obtained. The reaction was then cooled to a temperature of about 25° C. while adding about 209.5 grams of water. While continuing to cool the reaction mixture, about 64.6 grams of 31.5% hydrochloric acid was added, followed by about 86 grams of water. The pH was measured and additional hydrochloric acid was added to produce the second thermoplastic PAE resin that had a pH of about 4. Water was added to adjust the final solids concentration of the second thermoplastic PAE resin to about 15 wt %. The second thermoplastic PAE resin had a viscosity of about 35 cP, as measured by a Brookfield small sample adapter at a temperature of about 25° C. The second thermoplastic resin had a number average molecular weight of about of 26,450, a weight average molecular weight of about 745,000, and a z-average molecular weight of about 10,920,000.

Example 7

Preparation of a Second Thermosetting PAE Resin from Prepolymer II

A glass reactor with a 5-neck top and equipped with a glass stirring shaft, an equal-pressure addition funnel, a temperature probe, a pH probe, a heating mantle, coiled stainless-steel tubing for circulation of cooling water, and a vacuum-actuated sample tube to allow for the removal and return of sample aliquots from the reactor was used to produce a second thermosetting PAE resin from prepolymer II. To the reactor about 409.1 grams of water was added, followed by about 236 grams of prepolymer II. A small amount of water was added to adjust the prepolymer concentration to about 18.9%. The mixture was heated to a temperature of about 30° C. and about 11.64 grams of epichlorohydrin was added to produce a reaction mixture. The reaction mixture was first stirred for a time period of about 10 minutes at a temperature of about 30° C., and was then heated over a time period of about 15 minutes to a temperature of about 45° C. The viscosity of the reaction mixture was measured at about 15 minute intervals until a Gardner-Holdt bubble tube viscosity of about A was obtained. The reaction mixture was cooled to a temperature of about 32° C. The reaction was sampled at about 10 minute intervals until a Gardner-Holdt viscosity of about E was obtained, whereupon about 260.1 grams of water was rapidly added. The reaction mixture was cooled to a temperature of about 25° C. while adding about 15.1 grams of 93% sulfuric acid to provide a Gardner-Holdt bubble tube viscosity of about C, and a pH of about 7.2. The pH of the mixture was adjusted to about 4 with additional 93% sulfuric acid. About 66.3 grams of water was added to produce the second thermosetting PAE resin that had a solids concentration of about 15 wt %. The second thermosetting PAE resin had a viscosity of about 37 cP, as measured by a Brookfield small sample adapter at a temperature of about 25° C. The second thermosetting PAE resin had a number average molecular weight of about 27,100, a weight average molecular weight of about 667,000, and a z-average molecular weight of about 9,350,000.

Example 8

Preparation of a Third Thermosetting Resin from Prepolymer III

A glass reactor with a 5-neck top and equipped with a glass stirring shaft, an equal-pressure addition funnel, a temperature probe, a pH probe, a heating mantle, coiled stainless-steel tubing for circulation of cooling water, and a vacuum-actuated sample tube to allow for the removal and return of sample aliquots from the reactor was used to produce a third thermosetting resin from the prepolymer III. To the reactor about 350.4 grams of water was added, followed by about 216.8 grams of Prepolymer III. The mixture was heated to a temperature of about 30° C. and about 17.4 grams of epichlorohydrin was added to produce a reaction mixture. The reaction mixture was heated to a temperature of about 35° C. over a time period of about 75 minutes. The viscosity of the reaction mixture was measured at about 10 minute intervals with a Brookfield small sample adapter at a temperature of about 25° C. When the viscosity of the reaction mixture had advanced to about 30 cP the mixture was cooled to a temperature of about 23° C. The reaction mixture was allowed to advance in viscosity to about 70 cP as measured by Brookfield small sample adapter at a temperature of about 25° C., at which point the reaction temperature was cooled to a temperature of about 15° C. The reaction mixture was allowed to further advance to an end-point viscosity of about 180 cP, and about 192.3 grams of water was rapidly added thereto. About 29.54 grams of 85% phosphoric acid as added to adjust the pH of the mixture to about 5.7. An additional 10.1 grams of 85% phosphoric acid was added to the mixture to produce the third thermosetting PAE resin that had a final pH of about 4.25. Water was added to adjust the solids concentration of the third thermosetting PAE resin to about 15 wt %. The third thermosetting PAE resin had a viscosity of about 85 cP, as measured by a Brookfield small sample adapter at a temperature of about 25° C. The third thermosetting PAE resin had a number average molecular weight of about 25,500, a weight average molecular weight of about 852,000, and a z-average molecular weight of about 10,400,000.

Example 9

Preparation of a Blended Creping Adhesive

In a glass reactor equipped with a glass stirring shaft was added the first thermosetting resin (about 4.53 wt %), the second thermosetting resin (about 26.12 wt %), the first thermoplastic resin (about 17.50 wt %), the second thermoplastic resin (about 28.21 wt %), and glycerin 100% (about 0.75 wt %), and water (about 22.88 wt %). The resulting mixture was stirred and stored in cool environment. The blended adhesive had a viscosity of about 26 cP, as measured by a Brookfield small sample adapter at a temperature of about 25° C., a pH of about 6, and a solids concentration of about 15.8 wt %.

Embodiments of the present disclosure further relate to any one or more of the following paragraphs:

1. A creping adhesive, comprising: a first thermosetting polyamidoamine-epihalohydrin resin comprising a reaction product of a first epihalohydrin and a first polyamidoamine containing one or more secondary amine groups, wherein the first thermosetting polyamidoamine-epihalohydrin resin has a weight average molecular weight of about 800,000 to about 1,200,000, comprises about 2 moles to about 500 moles of reactive groups per mole of the first thermosetting polyamidoamine-epihalohydrin resin, and has a molar ratio of the first epihalohydrin to the secondary amine groups in the first polyamidoamine of about 0.002:1 to about 0.1:1, and wherein the reactive groups of the first thermosetting polyamidoamine-epihalohydrin resin comprise azetidinium groups, pendant halo-groups, or both; a first thermoplastic polyamidoamine-epihalohydrin resin comprising a reaction product of a second epihalohydrin and a second polyamidoamine containing one or more secondary amine groups, wherein the first thermoplastic polyamidoamine-epihalohydrin resin has a weight average molecular weight of about 40,000 to about 200,000, and has a molar ratio of the second epihalohydrin to the secondary amine groups in the second polyamidoamine of about 0.001:1 to about 0.1:1; and one or more re-wetting agents, wherein the creping adhesive comprises about 5 wt % to about 80 wt % of the first thermosetting polyamidoamine-epihalohydrin resin, about 15 wt % to about 90 wt % of the first thermoplastic polyamidoamine-epihalohydrin resin, and about 0.1 wt % to about 30 wt % of the one or more re-wetting agents, and wherein all weight percent values are based on the combined weight of the first thermosetting polyamidoamine-epihalohydrin resin, the first thermoplastic polyamidoamine-epihalohydrin resin, and the one or more re-wetting agents.

2. A method for creping a cellulosic fiber web, comprising: applying a creping adhesive to a drying surface, wherein the creping adhesive comprises: a first thermosetting polyamidoamine-epihalohydrin resin comprising a reaction product of a first epihalohydrin and a first polyamidoamine containing one or more secondary amine groups, wherein the first thermosetting polyamidoamine-epihalohydrin resin has a weight average molecular weight of about 800,000 to about 1,200,000, comprises about 2 moles to about 500 moles of reactive groups per mole of the first thermosetting polyamidoamine-epihalohydrin resin, and has a molar ratio of the first epihalohydrin to the secondary amine groups in the first polyamidoamine of about 0.002:1 to about 0.1:1, and wherein the reactive groups of the first thermosetting polyamidoamine-epihalohydrin resin comprise azetidinium groups, pendant halo-groups, or both; a first thermoplastic polyamidoamine-epihalohydrin resin comprising a reaction product of a second epihalohydrin and a second polyamidoamine containing one or more secondary amine groups, wherein the first thermoplastic polyamidoamine-epihalohydrin resin has a weight average molecular weight of about 40,000 to about 200,000, and has a molar ratio of the second epihalohydrin to the secondary amine groups in the second polyamidoamine of about 0.001:1 to about 0.1:1; and one or more re-wetting agents, wherein the creping adhesive comprises about 5 wt % to about 80 wt % of the first thermosetting polyamidoamine-epihalohydrin resin, about 15 wt % to about 90 wt % of the first thermoplastic polyamidoamine-epihalohydrin resin, and about 0.1 wt % to about 30 wt % of the one or more re-wetting agents, and wherein all weight percent values are based on the combined weight of the first thermosetting polyamidoamine-epihalohydrin resin, the first thermoplastic polyamidoamine-epihalohydrin resin, and the one or more re-wetting agents; adhering a cellulosic fiber web to the drying surface with the creping adhesive; and dislodging the adhered cellulosic fiber web from the drying surface.

3. A creped product, comprising: a creped cellulosic fiber web; and an at least partially cured creping adhesive, wherein, prior to curing, the creping adhesive comprises: a first thermosetting polyamidoamine-epihalohydrin resin comprising a reaction product of a first epihalohydrin and a first polyamidoamine containing one or more secondary amine groups, wherein the first thermosetting polyamidoamine-epihalohydrin resin has a weight average molecular weight of about 800,000 to about 1,200,000, comprises about 2 moles to about 500 moles of reactive groups per mole of the first thermosetting polyamidoamine-epihalohydrin resin, and has a molar ratio of the first epihalohydrin to the secondary amine groups in the first polyamidoamine of about 0.002:1 to about 0.1:1, and wherein the reactive groups of the first thermosetting polyamidoamine-epihalohydrin resin comprise azetidinium groups, pendant halo-groups, or both; a first thermoplastic polyamidoamine-epihalohydrin resin comprising a reaction product of a second epihalohydrin and a second polyamidoamine containing one or more secondary amine groups, wherein the first thermoplastic polyamidoamine-epihalohydrin resin has a weight average molecular weight of about 40,000 to about 200,000, and has a molar ratio of the second epihalohydrin to the secondary amine groups in the second polyamidoamine of about 0.001:1 to about 0.1:1; and one or more re-wetting agents, wherein the creping adhesive comprises about 5 wt % to about 80 wt % of the first thermosetting polyamidoamine-epihalohydrin resin, about 15 wt % to about 90 wt % of the first thermoplastic polyamidoamine-epihalohydrin resin, and about 0.1 wt % to about 30 wt % of the one or more re-wetting agents, and wherein all weight percent values are based on the combined weight of the first thermosetting polyamidoamine-epihalohydrin resin, the first thermoplastic polyamidoamine-epihalohydrin resin, and the one or more re-wetting agents.

4. The creping adhesive, method, or product according to any one of paragraphs 1 to 3, wherein the creping adhesive further comprises a second thermosetting polyamidoamine-epihalohydrin resin comprising a reaction product of a third epihalohydrin and a third polyamidoamine containing one or more secondary amine groups, wherein the second thermosetting polyamidoamine-epihalohydrin resin has a weight average molecular weight of about 150,000 to about 800,000, comprises about 500 moles to about 700 moles of reactive groups per mole of the second thermosetting polyamidoamine-epihalohydrin resin, and has a molar ratio of the third epihalohydrin to the secondary amine groups in the third polyamidoamine of about 0.5:1 to about 0.7:1, wherein the reactive groups of the second thermosetting polyamidoamine-epihalohydrin resin comprise azetidinium groups, pendant halo-groups, or both, wherein the creping adhesive comprises about 25 wt % to about 60 wt % of the second thermosetting polyamidoamine-epihalohydrin resin, and wherein all weight percent values are based on the combined weight of the first thermosetting polyamidoamine-epihalohydrin resin, the first thermoplastic polyamidoamine-epihalohydrin resin, the second thermosetting polyamidoamine-epihalohydrin resin, and the one or more re-wetting agents.

5. The creping adhesive, method, or product according to any one of paragraphs 1 to 4, wherein the creping adhesive further comprises a second thermoplastic polyamidoamine-epihalohydrin resin comprising a reaction product of a fourth epihalohydrin and a fourth polyamidoamine containing one or more secondary amine groups, wherein the second thermoplastic polyamidoamine-epihalohydrin has a weight average molecular weight of about 200,000 to about 3,000,000, and has a molar ratio of the fourth epihalohydrin to the secondary amine groups in the fourth polyamidoamine of about 0.001:1 to about 0.1:1, wherein the creping adhesive comprises about 20 wt % to about 65 wt % of the second thermoplastic polyamidoamine-epihalohydrin resin, and wherein all weight percent values are based on the combined weight of the first thermosetting polyamidoamine-epihalohydrin resin, the first thermoplastic polyamidoamine-epihalohydrin resin, the second thermosetting polyamidoamine-epihalohydrin resin, the second thermoplastic polyamidoamine-epichlorohydrin resin, and the one or more re-wetting agents.

6. The creping adhesive, method, or product according to any one of paragraphs 1 to 5, wherein the creping adhesive further comprises a third thermosetting polyamidoamine-epihalohydrin resin comprising a reaction product of a fifth epihalohydrin and a fifth polyamidoamine containing one or more secondary amine groups, wherein the third thermosetting polyamidoamine-epihalohydrin resin has a weight average molecular weight of about 700,000 to about 1,500,000, comprises about 500 moles to about 700 moles of reactive groups per mole of the third thermosetting polyamidoamine-epihalohydrin resin, and has a molar ratio of the fifth epihalohydrin to the secondary amine groups in the fifth polyamidoamine of about 0.2:1 to about 0.6:1, wherein the reactive groups comprise azetidinium groups, pendant halo-groups, or both, wherein the creping adhesive comprises about 5 wt % to about 70 wt % of the first thermosetting polyamidoamine-epihalohydrin resin, about 15 wt % to about 80 wt % of the first thermoplastic polyamidoamine-epihalohydrin resin, about 25 wt % to about 60 wt % of the second thermosetting polyamidoamine-epihalohydrin resin, about 20 wt % to about 65 wt % of the second thermoplastic polyamidoamine-epihalohydrin resin, and about 2 wt % to about 65 wt % of the third thermosetting polyamidoamine-epihalohydrin resin, and wherein all weight percent values are based on the combined weight of the first thermosetting polyamidoamine-epihalohydrin resin, the first thermoplastic polyamidoamine-epihalohydrin resin, the second thermosetting polyamidoamine-epihalohydrin resin, the second thermoplastic polyamidoamine-epichlorohydrin resin, the third thermosetting polyamidoamine-epichlorohydrin resin, and the one or more re-wetting agents.

7. The creping adhesive, method, or product according to paragraph 4 to 6, wherein the first thermosetting polyamidoamine-epihalohydrin resin comprises less than 500 moles of reactive groups per mole of the first thermosetting polyamidoamine-epihalohydrin resin, and wherein the second thermosetting polyamidoamine-epihalohydrin resin comprises greater than 500 moles of reactive groups per mole of the second thermosetting polyamidoamine-epihalohydrin resin.

8. The creping adhesive, method, or product according to any one of paragraphs 4 to 7, wherein the first thermosetting polyamidoamine-epihalohydrin resin has a weight average molecular weight of greater than 800,000, and wherein the second thermosetting polyamidoamine-epihalohydrin resin has a weight average molecular weight of less than 800,000.

9. The creping adhesive, method, or product according to any one of paragraphs 5 to 8, wherein the first thermoplastic polyamidoamine-epihalohydrin resin has a weight average molecular weight of less than 200,000, and wherein the second thermoplastic polyamidoamine-epihalohydrin has a weight average molecular weight of greater than 200,000.

10. The creping adhesive, method, or product according to any one of paragraphs 6 to 9, wherein the molar ratio of the third epihalohydrin to the secondary amine groups in the third polyamidoamine of the second thermosetting polyamidoamine-epihalohydrin is greater than 0.5:1 to about 0.7:1, and wherein the molar ratio of the fifth epihalohydrin to the secondary amine groups in the fifth polyamidoamine of the third thermosetting polyamidoamine-epihalohydrin resin is less than 0.5:1.

11. The creping adhesive, method, or product according to any one of paragraphs 6 to 10, wherein the second thermosetting polyamidoamine-epihalohydrin resin has a weight average molecular weight of less than 700,000, and wherein the third thermosetting polyamidoamine-epihalohydrin resin has a weight average molecular weight of greater than 700,000.

12. The creping adhesive, method, or product according to any one of paragraphs 6 to 11, wherein the first thermosetting polyamidoamine-epihalohydrin resin comprises less than 500 moles of reactive groups per mole of the first thermosetting polyamidoamine-epihalohydrin resin, and wherein the third thermosetting polyamidoamine-epihalohydrin resin comprises greater than 500 moles of reactive groups per mole of the third thermosetting polyamidoamine-epihalohydrin resin.

13. The creping adhesive, method, or product according to any one of paragraphs 1 to 12, wherein the first thermosetting polyamidoamine-epihalohydrin resin has a weight average molecular weight of about 1,000,000 to about 1,200,000, wherein the first thermoplastic polyamidoamine-epihalohydrin resin has a weight average molecular weight of about 60,000 to about 120,000.

14. The creping adhesive, method, or product according to any one of paragraphs 4 to 12, wherein the second thermosetting polyamidoamine-epihalohydrin resin has a weight average molecular weight of about 150,000 to about 500,000.

15. The creping adhesive, method, or product according to any one of paragraphs 5 to 14, wherein the second thermoplastic polyamidoamine-epihalohydrin resin has a weight average molecular weight of about 650,000 to about 850,000.

16. The creping adhesive, method, or product according to any one of paragraphs 6 to 15, wherein the third thermosetting polyamidoamine-epihalohydrin resin has a weight average molecular weight of about 750,000 to about 950,000.

17. The creping adhesive, method, or product according to any one of paragraphs 1 to 16, wherein the one or more re-wetting agents comprise a protonated amine, a protonated polyamine, a quaternary ammonium salt, glycerin, a salt of a polycarboxylic acids neutralized with triethanolamine, or any mixture thereof.

18. The creping adhesive, method, or product according to any one of paragraphs 1 to 16, wherein the one or more re-wetting agents comprise a poly-quaternary ammonium salt.

19. The creping adhesive, method, or product according to any one of paragraphs 1 to 18, wherein the first thermosetting polyamidoamine-epihalohydrin resin has a secondary amine concentration of about 0.01 mmols per gram of the first thermosetting polyamidoamine-epihalohydrin resin to about 5 mmols per gram of the first thermosetting polyamidoamine-epihalohydrin resin, and wherein the first thermoplastic polyamidoamine-epihalohydrin resin has a secondary amine concentration of about 4 mmols per gram of the first thermoplastic polyamidoamine-epihalohydrin resin to about 8 mmols per gram of the first thermoplastic polyamidoamine-epihalohydrin resin.

20. The creping adhesive, method, or product according to any one of paragraphs 4 to 19, wherein the second thermosetting polyamidoamine-epihalohydrin resin has a secondary amine concentration of about 4 mmols per gram of the second thermosetting polyamidoamine-epihalohydrin resin to about 8 mmols per gram of the second thermosetting polyamidoamine-epihalohydrin resin.

21. The creping adhesive, method, or product according to any one of paragraphs 5 to 19, wherein the second thermoplastic polyamidoamine-epihalohydrin resin has a secondary amine concentration of about 4 mmols per gram of the second thermoplastic polyamidoamine-epihalohydrin resin to about 8 mmols per gram of the second thermoplastic polyamidoamine-epihalohydrin resin.

22. The creping adhesive, method, or product according to any one of paragraphs 6 to 19, wherein the third thermosetting polyamidoamine-epihalohydrin resin has a secondary amine concentration of about 0.05 mmols per gram of the third thermosetting polyamidoamine-epihalohydrin resin to about 0.3 mmols per gram of the third thermosetting polyamidoamine-epihalohydrin resin.

23. The creping adhesive, method, or product according to any one of paragraphs 1 to 22, wherein the creping adhesive has a swelling index of about 5 g of water per gram of crosslinked polymer to about 250 g of water per gram of crosslinked polymer, as measured after extraction in a Soxhlet extractor with boiling water for 75 minutes.

24. The creping adhesive, method, or product according to any one of paragraphs 1 to 22, wherein the swelling index of the creping adhesive is about 10 g of water per gram of crosslinked polymer to about 75 g of water per gram of crosslinked polymer, as measured after extraction in a Soxhlet extractor with boiling water for 75 minutes.

25. The creping adhesive, method, or product according to any one of paragraphs 1 to 22, wherein the swelling index of the creping adhesive is about 60 g of water per gram of crosslinked polymer to about 160 g of water per gram of crosslinked polymer, as measured after extraction in a Soxhlet extractor with boiling water for 75 minutes.

26. The creping adhesive, method, or product according to any one of paragraphs 1 to 22, wherein the swelling index of the creping adhesive is about 110 g of water per gram of crosslinked polymer to about 175 g of water per gram of crosslinked polymer, as measured after extraction in a Soxhlet extractor with boiling water for 75 minutes.

27. The creping adhesive, method, or product according to any one of paragraphs 1 to 22, wherein the swelling index of the creping adhesive is about 160 g of water per gram of crosslinked polymer to about 240 g of water per gram of crosslinked polymer, as measured after extraction in a Soxhlet extractor with boiling water for 75 minutes.

28. The creping adhesive, method, or product according to any one of paragraphs 1 to 27, wherein the creping adhesive has a pH of about 2 to about 8.5.

29. The creping adhesive, method, or product according to any one of paragraphs 1 to 28, wherein the creping adhesive has a pH of about 4 to about 8.

30. The creping adhesive, method, or product according to any one of paragraphs 1 to 29, wherein the creping adhesive has a pH of about 5 to about 7.

31. The creping adhesive, method, or product according to any one of paragraphs 1 to 30, wherein the creping adhesive further comprises one or more mineral acids, one or more organic acids, or any mixture thereof.

32. The creping adhesive, method, or product according to any one of paragraphs 1 to 30, wherein the creping adhesive further comprises a mineral acid, and wherein the mineral acid comprises hydrochloric acid, sulfuric acid, nitric acid, phosphoric acid, or any mixture thereof.

33. The creping adhesive, method, or product according to any one of paragraphs 1 to 30, wherein the creping adhesive further comprises an organic acid, and wherein the organic acid comprises methanesulfonic acid, formic acid, acetic acid, citric acid, lactic acid, lactobionic acid, or any mixture thereof.

34. The creping adhesive, method, or product according to any one of paragraphs 1 to 33, wherein the creping adhesive further comprises polyvinyl alcohol, hemicellulose, polyvinyl amine, polyacrylamide, or any mixture thereof.

35. The method according to any one of paragraphs 2 or 4 to 34, further comprising heating the cellulosic fiber web to a temperature of about 20° C. to about 80° C. when adhered to the drying surface.

36. The method according to any one of paragraphs 2 or 4 to 34, wherein the drying surface is heated to a temperature of about 100° C. to about 210° C.

37. The method according to any one of paragraphs 2 or 4 to 34, wherein the drying surface is heated to a temperature of at least 180° C. to about 210° C.

38. The method according to any one of paragraphs 6 to 38, wherein third thermosetting polyamidoamine-epihalohydrin resin is applied to the to the drying surface separately, with respect to the first thermosetting polyamidoamine-epihalohydrin resin, the first thermoplastic polyamidoamine-epihalohydrin resin, the second thermosetting polyamidoamine-epihalohydrin resin, and the second thermoplastic polyamidoamine-epihalohydrin resin.

39. The method according to any one of paragraphs 6 to 38, wherein applying the creping adhesive to the drying surface comprises applying a mixture comprising the first thermosetting polyamidoamine-epihalohydrin resin, the first thermoplastic polyamidoamine-epihalohydrin resin, the second thermosetting polyamidoamine-epihalohydrin resin, the second thermoplastic polyamidoamine-epihalohydrin resin, and the one or more re-wetting agents; and applying the third thermosetting polyamidoamine-epihalohydrin resin to the drying surface separately from the mixture such that the mixture and the third thermosetting polyamidoamine-epihalohydrin resin contact one another after being applied to the drying surface.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A creping adhesive, comprising:
   a first thermosetting polyamidoamine-epihalohydrin resin comprising a reaction product of a first epihalohydrin and a first polyamidoamine containing one or more secondary amine groups, wherein the first thermosetting polyamidoamine-epihalohydrin resin has a weight average molecular weight of about 800,000 to about 1,200,000, comprises about 2 moles to about 500 moles of reactive groups per mole of the first thermosetting polyamidoamine-epihalohydrin resin, and has a molar ratio of the first epihalohydrin to the secondary amine groups in the first polyamidoamine of about 0.002:1 to about 0.1:1, and wherein the reactive groups of the first thermosetting polyamidoamine-epihalohydrin resin comprise azetidinium groups, pendant halo-groups, or both;
   a first thermoplastic polyamidoamine-epihalohydrin resin comprising a reaction product of a second epihalohydrin and a second polyamidoamine containing one or more secondary amine groups, wherein the first thermoplastic polyamidoamine-epihalohydrin resin has a weight average molecular weight of about 40,000 to about 200,000, and has a molar ratio of the second epihalohydrin to the secondary amine groups in the second polyamidoamine of about 0.001:1 to about 0.1:1; and
   one or more re-wetting agents,
   wherein the creping adhesive comprises about 5 wt % to about 80 wt % of the first thermosetting polyamidoamine-epihalohydrin resin, about 15 wt % to about 90 wt % of the first thermoplastic polyamidoamine-epihalohydrin resin, and about 0.1 wt % to about 30 wt % of the one or more re-wetting agents, and wherein all weight percent values are based on the combined weight of the first thermosetting polyamidoamine-epihalohydrin resin, the first thermoplastic polyamidoamine-epihalohydrin resin, and the one or more re-wetting agents.

2. The creping adhesive of claim 1, wherein the creping adhesive further comprises a second thermosetting polyamidoamine-epihalohydrin resin comprising a reaction product of a third epihalohydrin and a third polyamidoamine containing one or more secondary amine groups, wherein the second thermosetting polyamidoamine-epihalohydrin resin has a weight average molecular weight of about 150,000 to about 800,000, comprises about 500 moles to about 700 moles of reactive groups per mole of the second thermosetting polyamidoamine-epihalohydrin resin, and has a molar ratio of the third epihalohydrin to the secondary amine groups in the third polyamidoamine of about 0.5:1 to about 0.7:1, wherein the reactive groups of the second thermosetting polyamidoamine-epihalohydrin resin comprise azetidinium groups, pendant halo-groups, or both, wherein the creping adhesive comprises about 25 wt % to about 60 wt % of the second thermosetting polyamidoamine-epihalohydrin resin, and wherein all weight percent values are based on the combined weight of the first thermosetting polyamidoamine-epihalohydrin resin, the first thermoplastic polyamidoamine-epihalohydrin resin, the second thermosetting polyamidoamine-epihalohydrin resin, and the one or more re-wetting agents.

3. The creping adhesive of claim 2, wherein the creping adhesive further comprises a second thermoplastic polyamidoamine-epihalohydrin resin comprising a reaction product of a fourth epihalohydrin and a fourth polyamidoamine containing one or more secondary amine groups, wherein the second thermoplastic polyamidoamine-epihalohydrin has a weight average molecular weight of about 200,000 to about 3,000,000, and has a molar ratio of the fourth epihalohydrin to the secondary amine groups in the fourth polyamidoamine of about 0.001:1 to about 0.1:1, wherein the creping adhesive comprises about 20 wt % to about 65 wt % of the second thermoplastic polyamidoamine-epihalohydrin resin, and wherein all weight percent values are based on the combined weight of the first thermosetting polyamidoamine-epihalohydrin resin, the first thermoplastic polyamidoamine-epihalohydrin resin, the second thermosetting polyamidoamine-epihalohydrin resin, the second thermoplastic polyamidoamine-epichlorohydrin resin, and the one or more re-wetting agents.

4. The creping adhesive of claim 3, wherein the creping adhesive further comprises a third thermosetting polyamidoamine-epihalohydrin resin comprising a reaction product of a fifth epihalohydrin and a fifth polyamidoamine containing one or more secondary amine groups, wherein the third thermosetting polyamidoamine-epihalohydrin resin has a weight average molecular weight of about 700,000 to about 1,500,000, comprises about 500 moles to about 700 moles of reactive groups per mole of the third thermosetting polyamidoamine-epihalohydrin resin, and has a molar ratio of the fifth epihalohydrin to the secondary amine groups in the fifth polyamidoamine of about 0.2:1 to about 0.6:1, wherein the reactive groups comprise azetidinium groups, pendant halogroups, or both, wherein the creping adhesive comprises about 5 wt % to about 70 wt % of the first thermosetting polyamidoamine-epihalohydrin resin, about 15 wt % to about 80 wt % of the first thermoplastic polyamidoamine-epihalohydrin resin, about 25 wt % to about 60 wt % of the second thermosetting polyamidoamine-epihalohydrin resin, about 20 wt % to about 65 wt % of the second thermoplastic polyamidoamine-epihalohydrin resin, and about 2 wt % to about 65 wt % of the third thermosetting polyamidoamine-epihalohydrin resin, and wherein all weight percent values are based on the combined weight of the first thermosetting polyamidoamine-epihalohydrin resin, the first thermoplastic polyamidoamine-epihalohydrin resin, the second thermosetting polyamidoamine-epihalohydrin resin, the second thermoplastic polyamidoamine-epichlorohydrin resin, the third thermosetting polyamidoamine-epichlorohydrin resin, and the one or more re-wetting agents.

5. The creping adhesive of claim 4, wherein the first thermosetting polyamidoamine-epihalohydrin resin has a weight average molecular weight of about 1,000,000 to about 1,200,000, wherein the first thermoplastic polyamidoamine-epihalohydrin resin has a weight average molecular weight of about 60,000 to about 120,000, wherein the second thermosetting polyamidoamine-epihalohydrin resin has a weight average molecular weight of about 150,000 to about 500,000, wherein the second thermoplastic polyamidoamine-epihalohydrin resin has a weight average molecular weight of about 650,000 to about 850,000, and wherein the third thermosetting polyamidoamine-epihalohydrin resin has a weight average molecular weight of about 750,000 to about 950,000.

6. The creping adhesive of claim 1, wherein the one or more re-wetting agents comprise a protonated amine, a protonated polyamine, a quaternary ammonium salt, glycerin, a salt of a polycarboxylic acids neutralized with triethanolamine, or any mixture thereof.

7. The creping adhesive of claim 1, wherein the one or more re-wetting agents comprise a poly-quaternary ammonium salt.

8. The creping adhesive of claim 1, wherein the first thermosetting polyamidoamine-epihalohydrin resin has a secondary amine concentration of about 0.01 mmols per gram of the first thermosetting polyamidoamine-epihalohydrin resin to about 5 mmols per gram of the first thermosetting polyamidoamine-epihalohydrin resin, and wherein the first thermoplastic polyamidoamine-epihalohydrin resin has a secondary amine concentration of about 4 mmols per gram of the first thermosetting polyamidoamine-epihalohydrin resin to about 8 mmols per gram of the first thermoplastic polyamidoamine-epihalohydrin resin.

9. The creping adhesive of claim 1, wherein the creping adhesive comprises crosslinks between secondary amine moieties and pendant halohydrin moieties, wherein the creping adhesive has a swelling index of about 5 g of water per gram of crosslinked polymer to about 250 g of water per gram of crosslinked polymer, as measured after extraction in a Soxhlet extractor with boiling water for 75 minutes.

10. The creping adhesive of claim 1, wherein the creping adhesive has a pH of about 2 to about 8.5.

11. The creping adhesive of claim 1, wherein the creping adhesive further comprises one or more mineral acids, one or more organic acids, or any mixture thereof.

12. The creping adhesive of claim 1, wherein the creping adhesive further comprises polyvinyl alcohol, hemicellulose, polyvinyl amine, polyacrylamide, or any mixture thereof.

13. The creping adhesive of claim 1, wherein the creping adhesive further comprises a second thermosetting polyamidoamine-epihalohydrin resin and a second thermoplastic polyamidoamine-epihalohydrin resin, wherein the second thermosetting polyamidoamine-epihalohydrin resin comprises a reaction product of a third epihalohydrin and a third polyamidoamine containing one or more secondary amine groups, wherein the second thermosetting polyamidoamine-epihalohydrin resin has a weight average molecular weight of about 150,000 to about 800,000, comprises about 500 moles to about 700 moles of reactive groups per mole of the second thermosetting polyamidoamine-epihalohydrin resin, and has a molar ratio of the third epihalohydrin to the secondary amine groups in the third polyamidoamine of about 0.5:1 to about 0.7:1, wherein the reactive groups of the second thermosetting polyamidoamine-epihalohydrin resin comprise azetidinium groups, pendant halo-groups, or both, wherein the second thermoplastic polyamidoamine-epihalohydrin resin comprises a reaction product of a fourth epihalohydrin and a fourth polyamidoamine containing one or more secondary amine groups, wherein the second thermoplastic polyamidoamine-epihalohydrin has a weight average molecular weight of about 200,000 to about 3,000,000, and has a molar ratio of the fourth epihalohydrin to the secondary amine groups in the fourth polyamidoamine of about 0.001:1 to about 0.1:1, and wherein the one or more re-wetting agents comprise a protonated amine, a protonated polyamine, a quaternary ammonium salt, glycerin, a salt of a polycarboxylic acids neutralized with triethanolamine, or any mixture thereof.

14. The creping adhesive of claim 1, wherein the creping adhesive further comprises a second thermosetting polyamidoamine-epihalohydrin resin and a second thermoplastic polyamidoamine-epihalohydrin resin, wherein the second thermosetting polyamidoamine-epihalohydrin resin comprises a reaction product of a third epihalohydrin and a third polyamidoamine containing one or more secondary amine groups, wherein the second thermosetting polyamidoamine-epihalohydrin resin has a weight average molecular weight of about 150,000 to about 800,000, comprises about 500 moles to about 700 moles of reactive groups per mole of the second thermosetting polyamidoamine-epihalohydrin resin, and has a molar ratio of the third epihalohydrin to the secondary amine groups in the third polyamidoamine of about 0.5:1 to about 0.7:1, wherein the reactive groups of the second thermosetting polyamidoamine-epihalohydrin resin comprise azetidinium groups, pendant halo-groups, or both, wherein the second thermoplastic polyamidoamine-epihalohydrin resin comprises a reaction product of a fourth epihalohydrin and a fourth polyamidoamine containing one or more secondary amine groups, wherein the second thermoplastic polyamidoamine-epihalohydrin has a weight average molecular weight of about 200,000 to about 3,000,000, and has a molar ratio of the fourth epihalohydrin to the secondary amine groups in the fourth polyamidoamine of about 0.001:1 to about 0.1:1, wherein the first thermosetting polyamidoamine-epihalohydrin resin has a secondary amine concentration of about 0.01 mmols per gram of the first thermosetting polyamidoamine-epihalohydrin resin to about 5 mmols per gram of the first thermosetting polyamidoamine-epihalohydrin resin, wherein the first thermoplastic polyamidoamine-epihalohydrin resin has a secondary amine concentration of about 4 mmols per gram of the first thermoplastic polyamidoamine-epihalohydrin resin to about 8 mmols per gram of the first thermoplastic polyamidoamine-epihalohydrin resin, and wherein the one or more re-wetting agents comprise a protonated amine, a protonated polyamine, a quaternary ammonium salt, glycerin, a salt of a polycarboxylic acids neutralized with triethanolamine, or any mixture thereof.

15. A method for creping a cellulosic fiber web, comprising:

applying a creping adhesive to a drying surface, wherein the creping adhesive comprises:

a first thermosetting polyamidoamine-epihalohydrin resin comprising a reaction product of a first epihalohydrin and a first polyamidoamine containing one or more secondary amine groups, wherein the first thermosetting polyamidoamine-epihalohydrin resin has a weight average molecular weight of about 800,000 to about 1,200,000, comprises about 2 moles to about 500 moles of reactive groups per mole of the first thermosetting polyamidoamine-epihalohydrin resin, and has a molar ratio of the first epihalohydrin to the secondary amine groups in the first polyamidoamine of about 0.002:1 to about 0.1:1, and wherein the reactive groups of the first thermosetting polyamidoamine-epihalohydrin resin comprise azetidinium groups, pendant halo-groups, or both;

a first thermoplastic polyamidoamine-epihalohydrin resin comprising a reaction product of a second epihalohydrin and a second polyamidoamine containing one or more secondary amine groups, wherein the first thermoplastic polyamidoamine-epihalohydrin resin has a weight average molecular weight of about 40,000 to about 200,000, and has a molar ratio of the second epihalohydrin to the secondary amine groups in the second polyamidoamine of about 0.001:1 to about 0.1:1; and one or more re-wetting agents, wherein the creping adhesive comprises about 5 wt % to about 80 wt % of the first thermosetting polyamidoamine-epihalohydrin resin, about 15 wt % to about 90 wt % of the first thermoplastic polyamidoamine-epihalohydrin resin, and about 0.1 wt % to about 30 wt % of the one or more re-wetting agents, and wherein all weight percent values are based on the combined weight of the first thermosetting polyamidoamine-epihalohydrin resin, the first thermoplastic polyamidoamine-epihalohydrin resin, and the one or more re-wetting agents;

adhering a cellulosic fiber web to the drying surface with the creping adhesive; and dislodging the adhered cellulosic fiber web from the drying surface.

16. The method of claim 15, wherein the creping adhesive further comprises a second thermosetting polyamidoamine-epihalohydrin resin and a second thermoplastic polyamidoamine-epihalohydrin resin, wherein the second thermosetting polyamidoamine-epihalohydrin resin comprises a reaction product of a third epihalohydrin and a third polyamidoamine containing one or more secondary amine groups, wherein the second thermosetting polyamidoamine-epihalohydrin resin has a weight average molecular weight of about 150,000 to about 800,000, comprises about 500 moles to about 700 moles of reactive groups per mole of the second thermosetting polyamidoamine-epihalohydrin resin, and has a molar ratio of the third epihalohydrin to the secondary amine groups in the third polyamidoamine of about 0.5:1 to about 0.7:1, wherein the reactive groups of the second thermosetting polyamidoamine-epihalohydrin resin comprise azetidinium groups, pendant halo-groups, or both, wherein the second thermoplastic polyamidoamine-epihalohydrin resin comprises a reaction product of a fourth epihalohydrin and a fourth polyamidoamine containing one or more secondary amine groups, wherein the second thermoplastic polyamidoamine-epihalohydrin has a weight average molecular weight of about 200,000 to about 3,000,000, and has a molar ratio of the fourth epihalohydrin to the secondary amine groups in the fourth polyamidoamine of about 0.001:1 to about 0.1:1.

17. The method of claim 16, further comprising applying a third thermosetting polyamidoamine-epihalohydrin resin to the drying surface, wherein the third thermosetting polyamidoamine-epihalohydrin resin comprises a reaction product of a fifth epihalohydrin and a fifth polyamidoamine containing one or more secondary amine groups, wherein the third thermosetting polyamidoamine-epihalohydrin resin has a weight average molecular weight of about 700,000 to about 1,500,000, comprises about 500 moles to about 700 moles of reactive groups per mole of the third thermosetting polyamidoamine-epihalohydrin resin, and has a molar ratio of the fifth epihalohydrin to the secondary amine groups in the fifth polyamidoamine of about 0.2:1 to about 0.6:1, wherein the reactive groups comprise azetidinium groups, pendant halo-groups, or both.

* * * * *